United States Patent
Shekhar et al.

(10) Patent No.: US 8,538,108 B2
(45) Date of Patent: Sep. 17, 2013

(54) METHOD AND APPARATUS FOR ACCELERATED ELASTIC REGISTRATION OF MULTIPLE SCANS OF INTERNAL PROPERTIES OF A BODY

(75) Inventors: Raj Shekhar, Elkridge, MD (US); Carlos Castro-Pareja, Aloha, OR (US); Omkar Dandekar, Baltimore, MD (US)

(73) Assignee: University of Maryland, Baltimore, Baltimore, MD (US)

( * ) Notice: Subject to any disclaimer, the term of this patent is extended or adjusted under 35 U.S.C. 154(b) by 1429 days.

(21) Appl. No.: 12/158,090

(22) PCT Filed: Dec. 19, 2006

(86) PCT No.: PCT/US2006/062347
§ 371 (c)(1), (2), (4) Date: Jun. 19, 2008

(87) PCT Pub. No.: WO2007/102920
PCT Pub. Date: Sep. 13, 2007

(65) Prior Publication Data
US 2008/0317317 A1    Dec. 25, 2008

Related U.S. Application Data

(60) Provisional application No. 60/752,239, filed on Dec. 20, 2005.

(51) Int. Cl.
*G06K 9/32* (2006.01)
*G06K 9/36* (2006.01)
*A61B 6/03* (2006.01)

(52) U.S. Cl.
USPC ................ 382/131; 378/901; 382/294

(58) Field of Classification Search
USPC .................... 382/131, 132; 378/4, 65, 901
See application file for complete search history.

(56) References Cited

U.S. PATENT DOCUMENTS

| 5,633,951 | A | | 5/1997 | Moshfeghi |
| 5,956,418 | A | | 9/1999 | Aiger et al. |
| 5,970,254 | A | * | 10/1999 | Cooke et al. ............ 712/37 |

(Continued)

OTHER PUBLICATIONS

Omkar Dandekar and Raj Shekhar, "FPGA-Accelerated Deformable Image Registration for Improved Target-Delineation During CT-Guided Interventions," IEEE Transactions on Biomedical Circuits and Systems, vol. 1, No. 2, Jun. 2007, p. 116-127.*

(Continued)

*Primary Examiner* — Allen C. Ho
(74) *Attorney, Agent, or Firm* — Evans & Molinelli PLLC; Eugene J. Molinelli

(57) ABSTRACT

Techniques for accelerated elastic registration include receiving reference scan data and floating scan data, and a first transformation for mapping coordinates of scan elements from the first scan to coordinates of scan elements in the second scan. A subset of contiguous scan elements is determined. At least one of several enhancements is implemented. In one enhancement cubic spline interpolation is nested by dimensions within a subset. In another enhancement, a local joint histogram of mutual information based on the reference scan data and the floating scan data for the subset is determined and subtracted from an overall joint histogram to determine a remainder joint histogram. Each subset is then transformed, used to compute an updated local histogram, and added to the remainder joint histogram to produce an updated joint histogram. In another enhancement, a measure of similarity other than non-normalized mutual information is derived from the updated joint histogram.

21 Claims, 14 Drawing Sheets

(56) References Cited

U.S. PATENT DOCUMENTS

| | | | |
|---|---|---|---|
| 6,106,466 | A | 8/2000 | Sheehan et al. |
| 6,108,745 | A * | 8/2000 | Gupta et al. ..................... 711/3 |
| 6,385,332 | B1 | 5/2002 | Zahalka et al. |
| 6,470,071 | B1 * | 10/2002 | Baertsch et al. ................ 378/62 |
| 6,539,127 | B1 * | 3/2003 | Roche et al. .................. 382/294 |
| 6,670,614 | B1 | 12/2003 | Plut et al. |
| 6,728,424 | B1 * | 4/2004 | Zhu et al. ..................... 382/294 |
| 6,775,404 | B1 | 8/2004 | Pagoulatos et al. |
| 6,775,405 | B1 | 8/2004 | Zhu |
| 7,043,062 | B2 | 5/2006 | Gerard et al. |
| 7,043,063 | B1 | 5/2006 | Noble et al. |
| 7,206,462 | B1 | 4/2007 | Betke et al. |
| 7,280,710 | B1 | 10/2007 | Castro-Pareja et al. |
| 7,349,583 | B2 | 3/2008 | Kumar et al. |
| 7,372,984 | B2 | 5/2008 | Dickinson |
| 7,483,034 | B2 * | 1/2009 | Chefd'hotel et al. ......... 345/582 |
| 7,526,112 | B2 | 4/2009 | Murphy et al. |
| 7,536,042 | B2 | 5/2009 | Murphy et al. |
| 7,596,283 | B2 * | 9/2009 | Xu et al. ....................... 382/294 |
| 7,639,896 | B2 | 12/2009 | Sun et al. |
| 7,653,227 | B2 | 1/2010 | Krishnan et al. |
| 7,689,021 | B2 | 3/2010 | Shekhar |
| 7,693,563 | B2 | 4/2010 | Suresh et al. |
| 7,706,633 | B2 * | 4/2010 | Chefd'hotel et al. ......... 382/294 |
| 7,715,654 | B2 | 5/2010 | Chefd'hotel et al. |
| 7,822,291 | B2 | 10/2010 | Guetter |
| 7,840,249 | B2 | 11/2010 | Wang et al. |
| 7,876,938 | B2 | 1/2011 | Huang et al. |
| 7,945,080 | B2 | 5/2011 | Rinck et al. |
| 7,948,503 | B2 | 5/2011 | Shekhar et al. |
| 7,949,498 | B2 | 5/2011 | Walker et al. |
| 8,031,211 | B2 | 10/2011 | Shekhar et al. |
| 2005/0089213 | A1 | 4/2005 | Geng |
| 2005/0190189 | A1 | 9/2005 | Chefd'hotel et al. |
| 2005/0238233 | A1 | 10/2005 | Mulet Parada et al. |
| 2006/0029291 | A1 | 2/2006 | Sun et al. |
| 2006/0093209 | A1 | 5/2006 | Guetter |
| 2006/0171586 | A1 | 8/2006 | Georgescu |
| 2006/0247513 | A1 | 11/2006 | Wang |
| 2006/0275745 | A1 | 12/2006 | Schwarz |
| 2007/0071295 | A1 | 3/2007 | Jackson |
| 2007/0081712 | A1 | 4/2007 | Huang |
| 2007/0167784 | A1 | 7/2007 | Shekhar |
| 2008/0265166 | A1 | 10/2008 | Shekhar |
| 2008/0317317 | A1 | 12/2008 | Shekhar |
| 2009/0116716 | A1 | 5/2009 | Zhou |
| 2010/0027861 | A1 | 2/2010 | Shekhar |
| 2011/0052033 | A1 | 3/2011 | Shekhar |
| 2011/0193882 | A1 | 8/2011 | Shekhar |
| 2011/0262016 | A1 | 10/2011 | Shekhar |
| 2011/0311118 | A1 | 12/2011 | Shekhar |

OTHER PUBLICATIONS

Omkar Dandekar, Carlos Castro-Pareja, and Raj Shekhar, "FPGA-based real-time 3D image preprocessing for image-guided medical interventions," J. Real-Time Image Proc (2007) 1:285-301.*

Omkar Dandekar, Vivek Walimbe, and Raj Shekhar, "Hardware Implementation of Hierarchical Volume Subdivision-based Elastic Registration," Proceedings of the 28th IEEE EMBS Annual International Conference, New York City, USA, Aug. 30-Sep. 3, 2006, p. 1425-1428.*

Carlos Ó. S. Sorzano, Philippe Thévenaz, and Michael Unser, "Elastic Registration of Biological Images Using Vector-Spline Regularization," IEEE Transaction on Biomedical Engineering, vol. 52, No. 4, Apr. 2005, p. 652-663.*

Carlos R. Castro-Pareja, Jogikal M. Jagadeesh, and Raj Shekhar, "Fair: A Hardware Architecture for Real-Time 3D Image Registration," IEEE Transactions on Information Technology in Biomedicine, vol. 7, No. 4, Dec. 2003, p. 426-434.*

David Mattes et al., "PET-CT Image Registration in the Chest Using Free-form Deformations," IEEE Transactions on Medical Imaging, vol. 22, No. 1, Jan. 2003, p. 120-128.*

Raj Shenkhar et al., "High-Speed Registration of Three-and Four-dimensional Medical Images by Using Voxel Similarity," RadioGraphics 2003, vol. 23, No. 6, 1673-1681.*

Bosch, J., S. Mitchell, B. Lelieveldt, F. Nijland, O. Kamp, M. Sonka, and J. Reiber , "Automatic segmentation of echocardiographic sequences by active appearance motion models", "IEEE Trans. Med. Imag.", Nov. 1, 2002, pp. 1374-1383, vol. 21, No. 11, Publisher: Institute of Electrical and Electronics Engineers, Inc., Published in: New York.

C.R. Castro-Pareja, J. M. Jagadeesh, R. Shekhar, "FAIR: A Hardware Architecture for Real-Time 3-D Image Registration", "IEEE Transactions on Information Technology in Biomedicine", Dec. 1, 2003, pp. 426-434, vol. 7, No. 4, Publisher: IEEE, Published in: New York, NY USA.

A. Dorati, C. Lamberi , A. Sarti, P. Baraldi, and R. Pini, "Preprocessing for 3D echocardiography", "Computers in Cardiology 1995", Jun. 1, 1995, pp. 565-568, vol. 0276-6547/95, Publisher: IEEE, Published in: New York, NY US.

O. Gerard, A. C. Billon, J.-M. Rouet, M. Jacob, M. Fradkin, and C. Allouch, "Efficient model-based quantification of left ventricular function in 3-D echocardiography", "IEEE Trans. Med. Imag.", Sep. 1, 2002, pp. 1059-1068, vol. 21, No. 9, Publisher: Institute of Electrical and Electronics Engineers, Inc., Published in: New York.

J. F. Krucker, G. L. Lecarpentier, J. B. Fowlkes, and P. L. Carson, "Rapid elastic image registration for 3-D ultrasoun", "IEEE Trans. Med. Imag.", Nov. 1, 2002, pp. 1384-1394, vol. 21, No. 11, Publisher: IEEE, Published in: New York NY/US.

Lau, Y.H. and B.F. Hutton, "Non-rigid image registration using a median-filtered coarse-to-fine displacement field and symmetric correlation ratio", "Physics in Medicine and Biology", Apr. 1, 2001, pp. 1297-1319, vol. 46, No. 4, Publisher: Institute of Physics Publishing, Published in: United Kingdom.

F. Rousseau et al., "Evaluation of sub-voxel registration accuracy between MRI and 3D MR spectroscopy of the brain", "Medical Imaging 2005: Image Processing, Fitzpatrick and Reinhardt, Editors", Apr. 1, 2005, pp. 1213-1221, Volume Proceedings SPIE, No. 5747, Publisher: SPIE, Published in: Bellingham WA USA.

R. Shekhar and V. Zagrodsky, "Mutual Information-based rigid and nonrigid registration of ultrasound volumes","IEEE Transactions in Medical Imaging", Jan. 1, 2002, pp. 9-22, vol. 21, No. 1, Publisher: IEEE, Puublished in: New York, NY USA.

Shekhar R, Zagrodsky V, Walimbe V, "3D Stress Echocardiography: Development of novel visualization, registration and segmentation algorithms", "Proceedings of Computer Assisted Radiology and Surgery (CARS 2004)", Jun. 1, 2004, pp. 1072-1077, Publisher: Elsevier, Published in: Amsterdam/NL.

V. Walimbe, V. Zagrodsky, S. Raja, B. Bybel, M. Kanvinde and R. Shekhar, "Elastic registration of three-dimenstional whole body CT and PET images by quaternion-based interpolation of multiple pie", "Medical Imaging 2004: Image Processing", Jan. 1, 2004, pp. 119-128, Volume SPIEProceedings 5370, No. 1605-7422/04, Publisher: SPIE, Published in: Bellingham WA USA.

Yezzi, A., L. Zollei, and T. Kapur, "A variational framework for integrating segmentation and registration through active contours", "Med. Image Anal.", Jun. 1, 2003, pp. 171-185, vol. 7, No. -, Publisher: Elsevier, Published in: Amsterdam/NL.

\* cited by examiner

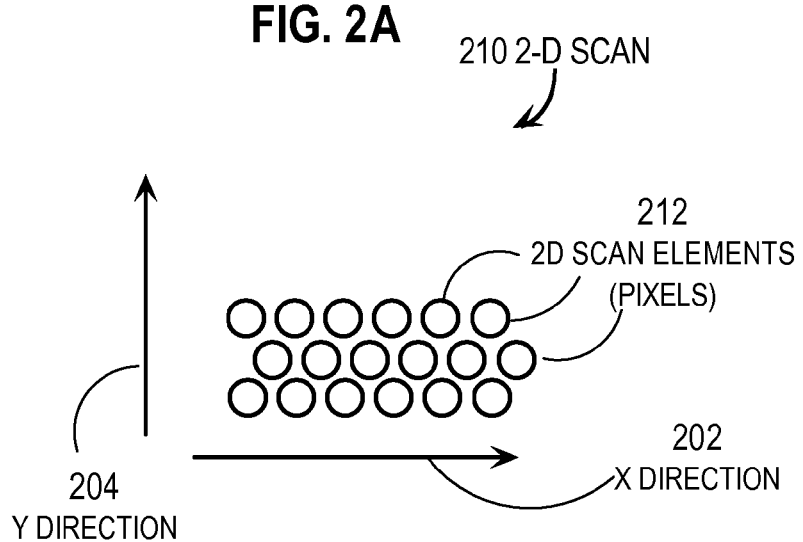
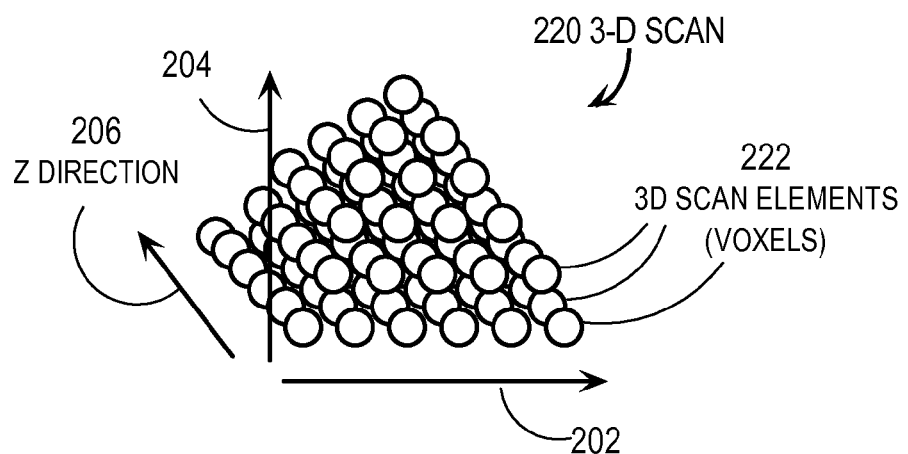
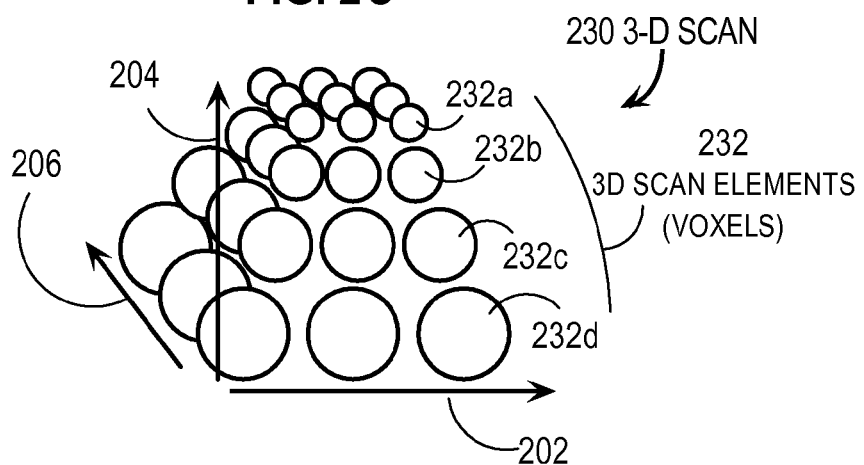

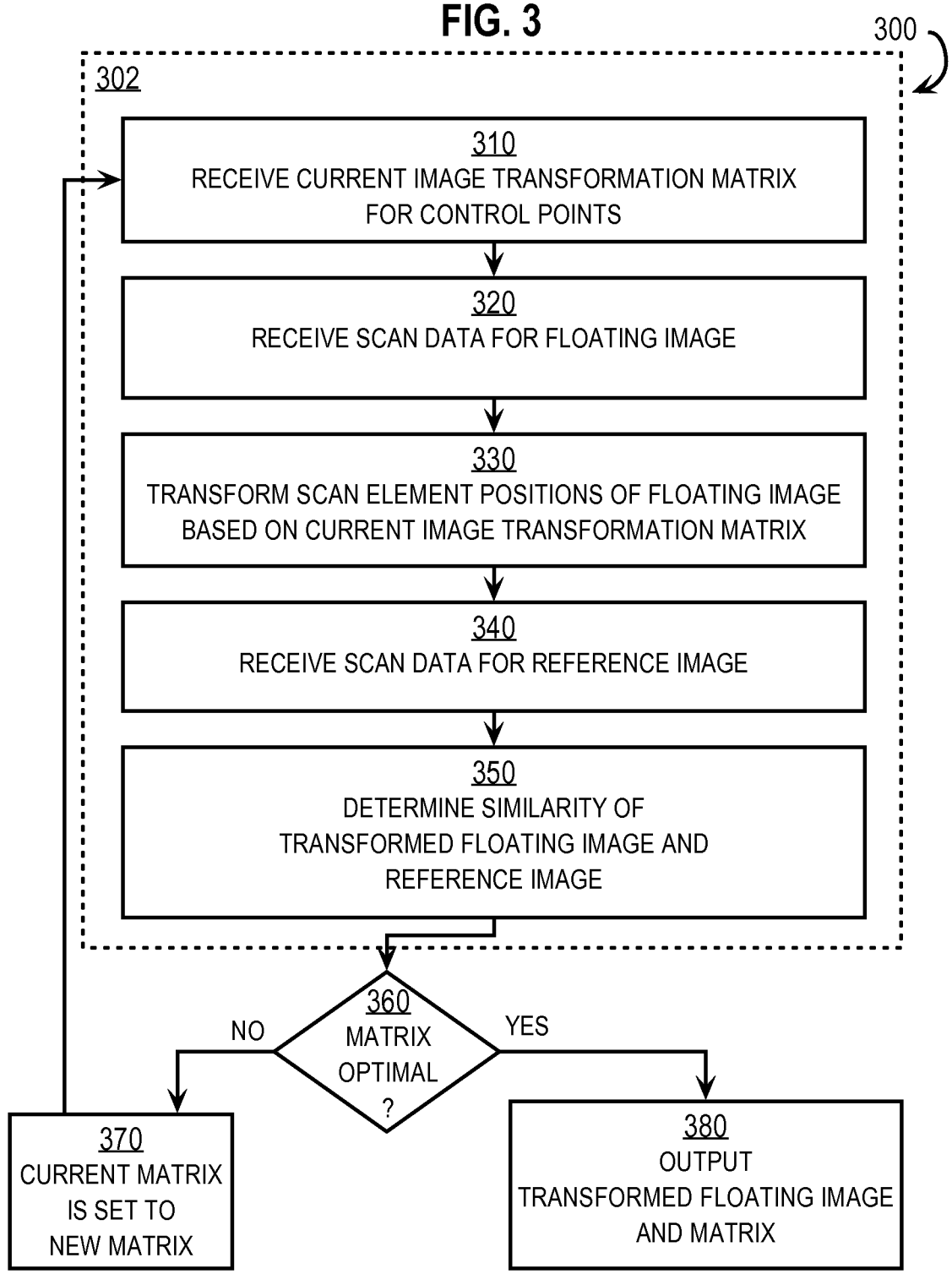

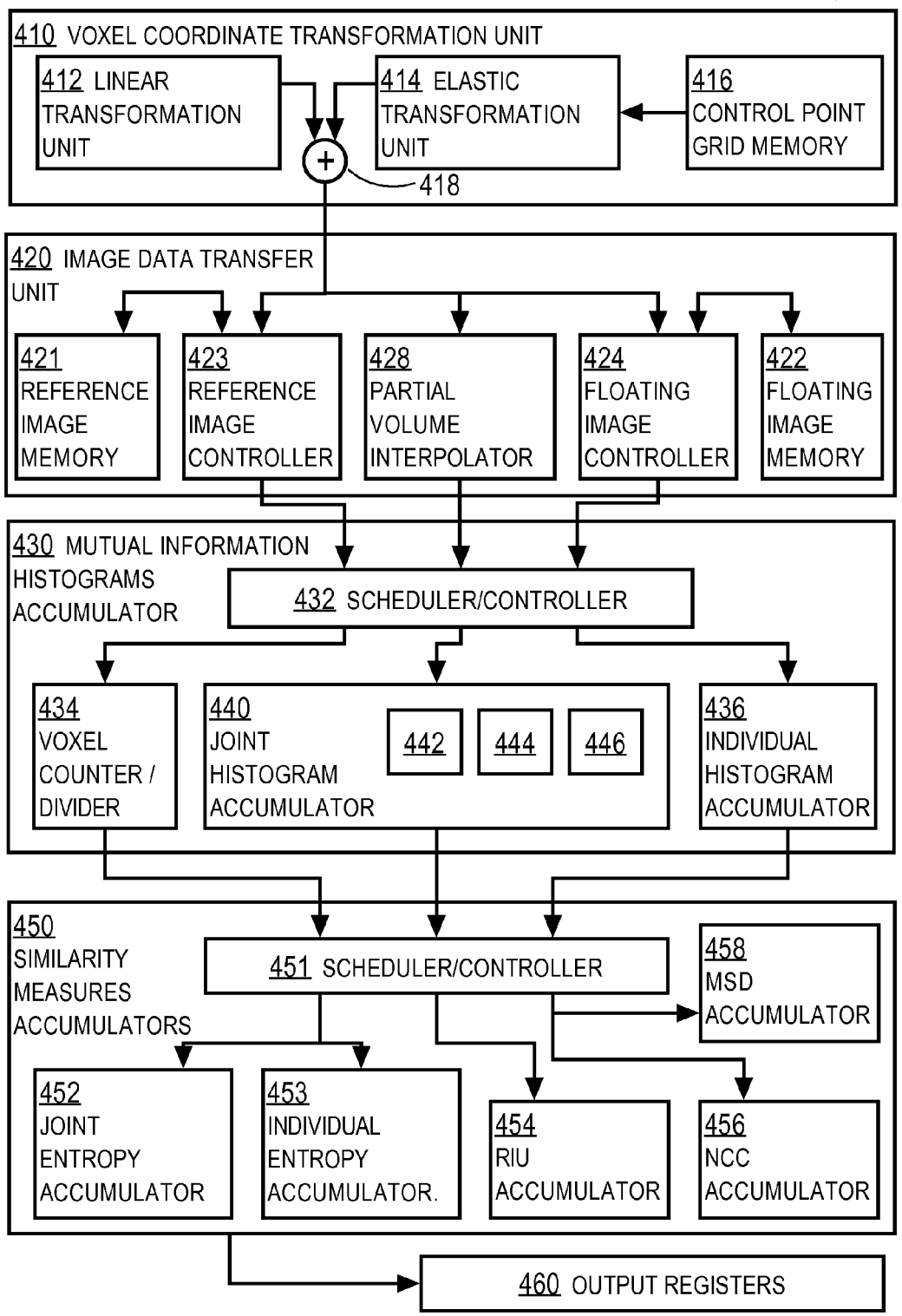

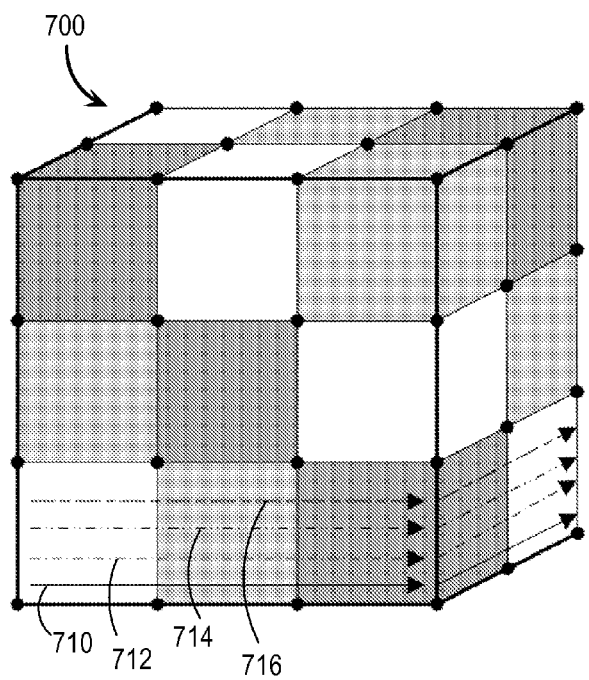
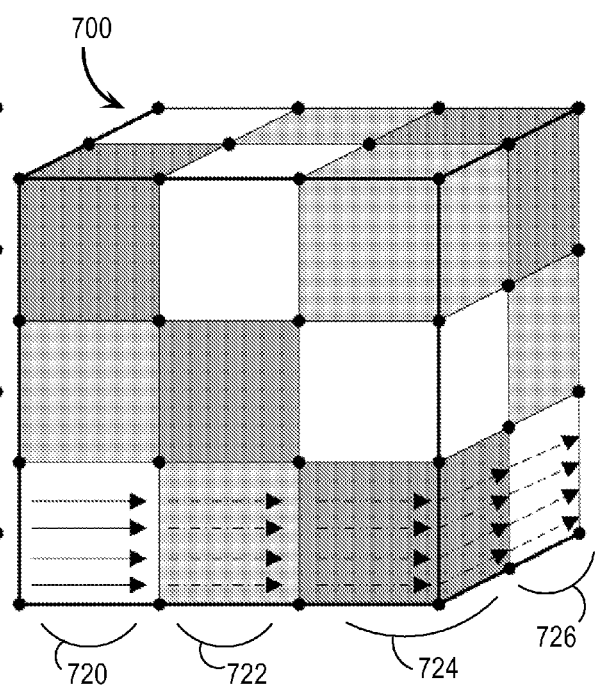

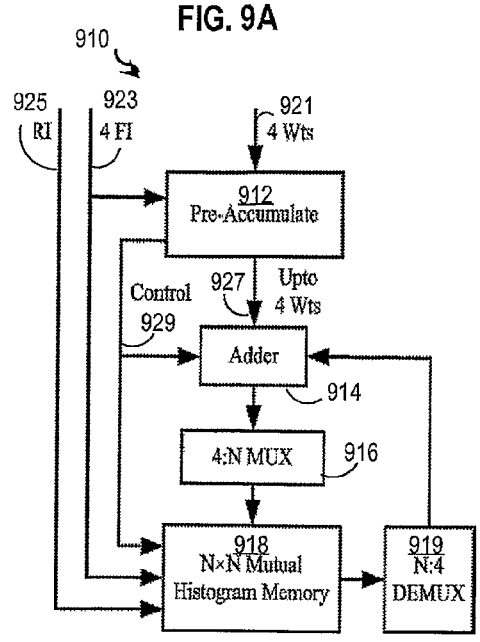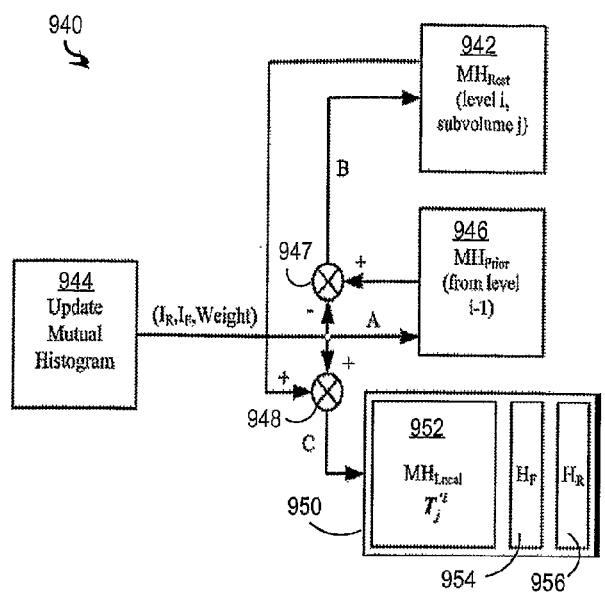
FIG. 9A
FIG. 9B

US 8,538,108 B2

METHOD AND APPARATUS FOR ACCELERATED ELASTIC REGISTRATION OF MULTIPLE SCANS OF INTERNAL PROPERTIES OF A BODY

CROSS-REFERENCE TO RELATED APPLICATIONS

This application claims benefit of Provisional Appln. 60/752,239, filed Dec. 20, 2005, the entire contents of which are hereby incorporated by reference as if fully set forth herein, under 35 U.S.C. §119(e).

STATEMENT OF GOVERNMENTAL INTEREST

This invention was made with Government support under National Medical Technology Testbed Grant No. DAMD 17-97-2-7016 awarded by the Department of Defense. The Government has certain rights in the invention.

BACKGROUND OF THE INVENTION

1. Field of the Invention

The present invention relates to a method and apparatus for registration of multiple scans of internal properties of a body, such as internal tissues of a living body; and, in particular to a method and apparatus that implement techniques to accelerate determination of an array of spatial transformations that elastically register an early scan to a current scan in time for a particular use, such as in time to adjust a planned treatment of the body to current conditions of the internal properties based on the current scan, or to efficiently produce an atlas or composite or diagnosis from a large number of scans.

2. Description of the Related Art

Healthcare delivery, whether financed by private or public funds, amounts to a multi-billion dollar business. Advances in healthcare improve the product obtained for those dollars and renders older techniques obsolete.

Several modern techniques for treatment of diseases of internal tissues of living bodies involve directing treatment to particular tissues and avoiding others. For example, in radiation therapy, one or more radioactive sources or beams of high energy particles are placed or focused on diseased tissues, such as tumors, while avoiding healthy tissues. In invasive radiology, probes are inserted into a living body to extract diseased tissue or introduce therapeutic agents at the site of particular diseased or healthy tissue in a living body. In laparoscopy, surgical instruments at a tip of a probe excise tissue and implant fasteners and other devices. The efficacy and safety of such directed treatments are affected by the accuracy of placement of the treatment.

Several technologies are available for non-invasively measuring the arrangement of tissues within a living body. These technologies, often called imaging technologies, produce scans of spatially arranged scan elements that depict spatial variations in measured quantities that are related to spatial changes of one or more physical properties in the tissues. Scan elements can be presented as images in color or gray-scale intensities. Often the measured quantity is intensity of electromagnetic or acoustic energy received in some time interval from some direction. The measured quantity depends on the spatial arrangement of absorption or speed in the intervening tissues, which in turn varies with the type of tissue. Well known imaging technologies includes computer-aided tomography of low intensity X-rays (CT) at regular doses and at low doses, nuclear magnetic resonance (NMR) imaging (MRI), positron emission tomography (PET) and ultrasound (US) imaging, among others. In various arrangements, two-dimensional (2D) and three-dimensional (3D) scans are formed. Such scans are also called images. Scan elements in a 2D scan are sometimes called picture elements (pixels) and scan elements in a 3D scan are sometimes called volume elements (voxels).

In stationary tissues, such as those within the skull when the skull is intact, the spatial arrangement of the tissue is constant and well known by fixing the position of certain external skeletal features that are used as landmarks, and collecting one or more images relative to those landmarks.

However, soft tissues outside the skull are able to flex and change size, shape or position over time, even when referenced to certain skeletal features that can be fixed. For example, organs and tumors in or near the thoracic cavity ebb and flow with the breathing of the living body. Tissue in and near the heart move with the beating of the heart. Tissues near the gastrointestinal track and urinary bladder, including the bladder and prostate in the human male, swell and shrink with the amount of consumed food and fluids being processed by the living body, and by the history of physical movement of the living body between scans. In brain surgeries performed open or endoscopically, the soft tissue motion and deformation problem occurs when the surgeon starts removing the tumor tissue.

For directed treatments that are administered over times long compared to the time scales of such flexing of soft tissue, a single scan of the soft tissue, no matter how high the spatial resolution, is not accurate for the entire treatment. Thus radiation directed to a target tissue (e.g., cancerous prostate) based on a single CT scan of the prostate can lead to irradiating non-target tissue during part of the treatment time, and failing to irradiate some target tissue during part of the treatment time. Similarly, navigating a probe according to a plan based on a planning image taken on one day may lead the probe incorrectly on a different day when treatment is administered.

In some past approaches, the treatments are based on one or more scans at a single time and the treatment area is expanded to treat all positions through which the target tissues may move during the treatment, e.g., expanding the treatment area beyond the target area by some amount or percentage that is expected to cover normal flexing of the soft tissue. While suitable for some applications, this approach suffers from the disadvantage that some non-target tissue is exposed to the treatment. For example, some healthy bladder and rectal tissue is subjected to radiation intended to kill cancerous prostate tissue.

In another approach, multiple scans are taken at different times and different treatments are applied for different scans. A problem with this approach is that some scans, such as CT scans, take many minutes to perform, are expensive, expose a patient to hazardous radiation, and can obstruct access to the tissue by the treatment provider, such as an interventional radiologist or a therapeutic radiation source. In many cases, such scans are not appropriate through the course of the treatment (a time period called herein "intra-treatment"). Another problem with this approach is that an analysis or treatment plan for the new scan may involve human interaction and can take considerable time to develop.

In some cases, one or more intra-treatment scans are taken using technologies that are faster, cheaper, safer or less obstructive, such as ultrasound which enjoys all four advantages. Other technologies appropriate for intra-treatment measurements include low-dose CT scans. It is anticipated that other appropriate imaging technologies will be developed in the future. However, a problem with this approach is that the intra-treatment scan technology often does not provide the spatial resolution needed. For example, in ultrasound there is low contrast between the prostate and bladder tissue compared to CT scans, and there is more noise in the form of speckle. Similarly, low dose CT has a lower signal to noise ratio. This approach also suffers the disadvantage that an analysis or treatment plan for the new scan may involve human interaction and can take considerable time to develop.

In such cases it would be beneficial to register the intra-treatment scan to a treatment planning scan taken and analyzed before treatment begins. Even if intra-treatment scans provided sufficient resolution, doctors would continue to use pre-treatment scans for planning and rehearsal. Thus there would still be a need to register pre-treatment scans associated with treatment plans to intra-treatment scans. Image registration is the process of aligning two or more images that represent the same object, where the images may be taken from different viewpoints or with different sensors or at different times or some combination. A transformation that aligns two images can be classified as rigid, affine, or elastic (including projective and curved transformations). Rigid transformations include translation or rotation or both. Affine transformations add shear or scale changes or both. An elastic transformation is a special case of a non-rigid transformation that allows for local adaptivity (e.g., uses a transform that varies with position within the scan) and is typically constrained to be continuous and smooth.

Because soft tissue can change shape and size as well as position, an elastic transformation is desired (provided by a so-called elastic registration process), rather than a rigid body or global affine transformation. A global affine transformation is an affine transformation that is applied to an image as a whole.

Thus, it would be beneficial if an analysis or treatment plan developed for an original scan (the treatment planning scan) can be elastically transformed to the new measurements by elastically registering the original scan to the new scan to account for the soft tissue flexing that has occurred since the original scan.

To be useful for treatment, however, the elastic registration (called intra-treatment elastic registration, herein) must be determined on a time scale short compared to the treatment duration. A problem with many current implementations of elastic registration is that they involve more computations and are more time consuming than rigid body or global affine transformations. Indeed, some experts have taught that elastic registration is rendered inappropriate for rapid intra-treatment applications (see, for example, W. R. Crum, T. Hartkens, and D. L. G. Hill, "Non-rigid image registration: theory and practice," *The British Journal of Radiology*, vol. 77, pp. S140-S153, 2004).

A recent approach has been presented to provide hardware acceleration for a particular type of elastic registration, one based on the computation of mutual information (MI) as a measure of similarity that is maximized to find the best registration. See C. R. Castro-Pareja, J. M. Jagadeesh, R. Shekhar, "FAIR: A hardware architecture for real-time 3_D image registration," International Electronics and Electrical Engineers (IEEE) Transactions on Information Technology in Biomedicine, vol. 7, no. 4, pp. 426-434, 2003 (hereinafter Castro-Pareja I) and C. R. Castro-Pareja, R. Shekhar, "Hardware acceleration of mutual information-based 3D image registration," Journal of Imaging Science & Technology, vol. 49, no. 2, pp. 105-113, 2005 (hereinafter Castro-Pareja II), the entire contents of each of which are hereby incorporated by reference as if fully set forth herein. While able to accelerate the computations of elastic registration to suitable speeds for some applications, there is need for further speed improvements for some kinds of scans and for some intra-treatment time scales, such as treatment of tumors in the lung or the treatment of sources of arrhythmia in the heart or determining when to activate a probe tip during interventional radiology.

Based on the foregoing, there is clear need for techniques based on one or more intra-treatment scans that provide intra-treatment elastic transformations of an analysis or treatment-plan from a treatment-planning scan, which do not suffer one or more disadvantages of prior art approaches.

In particular, there is a need for intra-treatment elastic registration between multiple scans of soft tissue in a living body, which do not suffer one or more disadvantages of prior art approaches.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for accelerated elastic registration, which do not suffer all the deficiencies of prior art approaches.

In one set of embodiments, a method for accelerated interpolation of elastic registration includes receiving control point transformation data that indicates a vector $\phi$ of values for transform parameters for each of multiple control points that correspond to scan elements in a reference scan. The vector $\phi$ of values for transform parameters for a particular control point indicates how to associate the particular control point with one or more scan elements in a floating scan different from the reference scan. Every scan element in the reference scan has a position indicated by multiple coordinate values for corresponding dimensions. Multiple subsets of contiguous scan elements are determined in the reference scan. Each subset of contiguous scan elements is associated with only one control point. An output vector v of values for transform parameters for each scan element is determined in a first subset of scan elements of the reference scan. This includes determining a first cubic B-spline coefficient coef1 and multiple second cubic B-spline coefficient coef2 in a particular order. Coef1=$\Sigma$B(w1) $\phi$ for a first coordinate value of a scan element in the first subset a distance w1 from a control point along a first dimension summed over four control points. For each coef1, coef2=$\Sigma$B(w2) coef1 for corresponding coordinate values of scan elements in the first subset a distance w2 from a control point along a different second dimension, each summed over four control points. The output vector v is determined based at least in part on coef2 for each scan element in the first subset. After determining the output vector v of values for each scan element in the first subset, then the output vector v of values for each scan element in a different second subset of scan elements of the reference scan is determined. B(n) is a well known function for contributions at an arbitrary point from a control point at a normalized distance n=d/s; where d is distance from the control point to the arbitrary point and s is separation of adjacent control points that straddle the arbitrary point.

In another set of embodiments, a method for accelerated determination of joint histograms for measures of similarity for elastic registration includes receiving reference scan data and floating scan data. The reference scan data indicates, for multiple scan elements, corresponding intensity values based on a first scan of the body. The floating scan data indicates, for the multiple scan elements, corresponding intensity values based on a different second scan of the body and a first transformation for mapping coordinates of scan elements from the first scan to coordinates of scan elements in the second scan. A two dimensional first joint histogram of mutual information is determined based on the reference scan data and the floating scan data. The joint histogram indicates a number of scan elements that have intensity values based on the first scan in a first range of intensities and have intensity values based on the second scan in a second range of intensities. A subset of contiguous scan elements is determined. A local joint histogram of mutual information is determined based on the reference scan data and the floating scan data for the subset of contiguous scan elements. A remainder joint histogram of mutual information is determined by subtracting the local joint histogram from the first joint histogram. A value for a similarity measure is determined, based at least in part on the remainder joint histogram, for a second transformation for mapping coordinates of the subset from the first scan to coordinates of corresponding scan elements in the second scan.

In another set of embodiments, a method for determining measures of similarity for elastic registration includes receiving reference scan data and floating scan data. The reference scan data indicates, for multiple scan elements, corresponding intensity values based on a first scan of the body. The floating scan data indicates, for the same scan elements, corresponding intensity values based on a different second scan of the body and a first transformation for mapping coordinates of scan elements from the first scan to coordinates of scan elements in the second scan. A two dimensional joint histogram of mutual information is determined based on the reference scan data and the floating scan data. The joint histogram indicates a number of the scan elements that have intensity values based on the first scan in a first range of intensities and have intensity values based on the second scan in a second range of intensities. Based on the joint histogram a measure of similarity that is not mutual information is determined for the reference scan data and the floating scan data. An elastic transformation is determined based on the measure of similarity.

In other sets of embodiments, an apparatus or a computer-readable medium or both implements one or more steps of the above methods.

In another set of embodiments, an apparatus for elastic registration of multiple scans of internal properties of a body includes a computer-readable medium for storing floating scan data for multiple scan elements. The computer-readable medium includes one Synchronized Dynamic Random Access Memory (SDRAM) dual in-line memory module (DIMM) with 64-bit addressing. Also included is a logic circuit for determining a joint histogram based at least in part on the floating scan data in the computer-readable medium. As a result, an elastic transformation can be determined based on the joint histogram.

In another set of embodiments, an apparatus includes a processor configured to perform in less time than ten minutes automatic elastic registration that maximizes a similarity measure based on substantively every scan element in a region of overlap between two scans each having 256×256× 256 scan elements.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram that illustrates scan elements in a 2D scan;

FIG. 2B is a block diagram that illustrates scan elements in a 3D scan;

FIG. 2C is a block diagram that illustrates different scan elements in a 3D scan;

FIG. 3 is a flow diagram that illustrates an elastic registration method, according to an embodiment;

FIG. 4 is a block diagram that illustrates component blocks of an apparatus for elastic registration of two scans, according to an embodiment;

FIG. 7A is a block diagram that illustrates sequential order for calculating interpolation coefficients between control points in subsets depicted in FIG. 6, according to one embodiment;

FIG. 7B is a block diagram that illustrates sequential order for calculating interpolation coefficients between control points in subsets depicted in FIG. 6, according to a different embodiment;

FIG. 9A is a block diagram that illustrates component blocks of an logic circuit to compute a joint histogram, according to an embodiment;

FIG. 9B is a block diagram that illustrates component blocks of an logic circuit to compute local and remainder joint histograms, according to an embodiment;

DETAILED DESCRIPTION

A method and apparatus are described for elastic registration of multiple scans. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are descried below in the context of hardware accelerated elastic registration of scans of internal tissues of a living body over intra-treatment time scales, because this is where the commercial incentive for increased speed originates at the time of this writing. However, the invention is not limited to this context. In other embodiments the techniques are implemented in software or hardware to elastically register any multiple scans such as scans of a geological formation, a building, a machine, or any other natural or man-made body with internal structure evident in the scans, whether or not treatment is involved or treatment time scales are short. This should also include merging of diagnostic scans and scans of multiple subjects for creation of an atlas.

1. Overview

Figure 1:
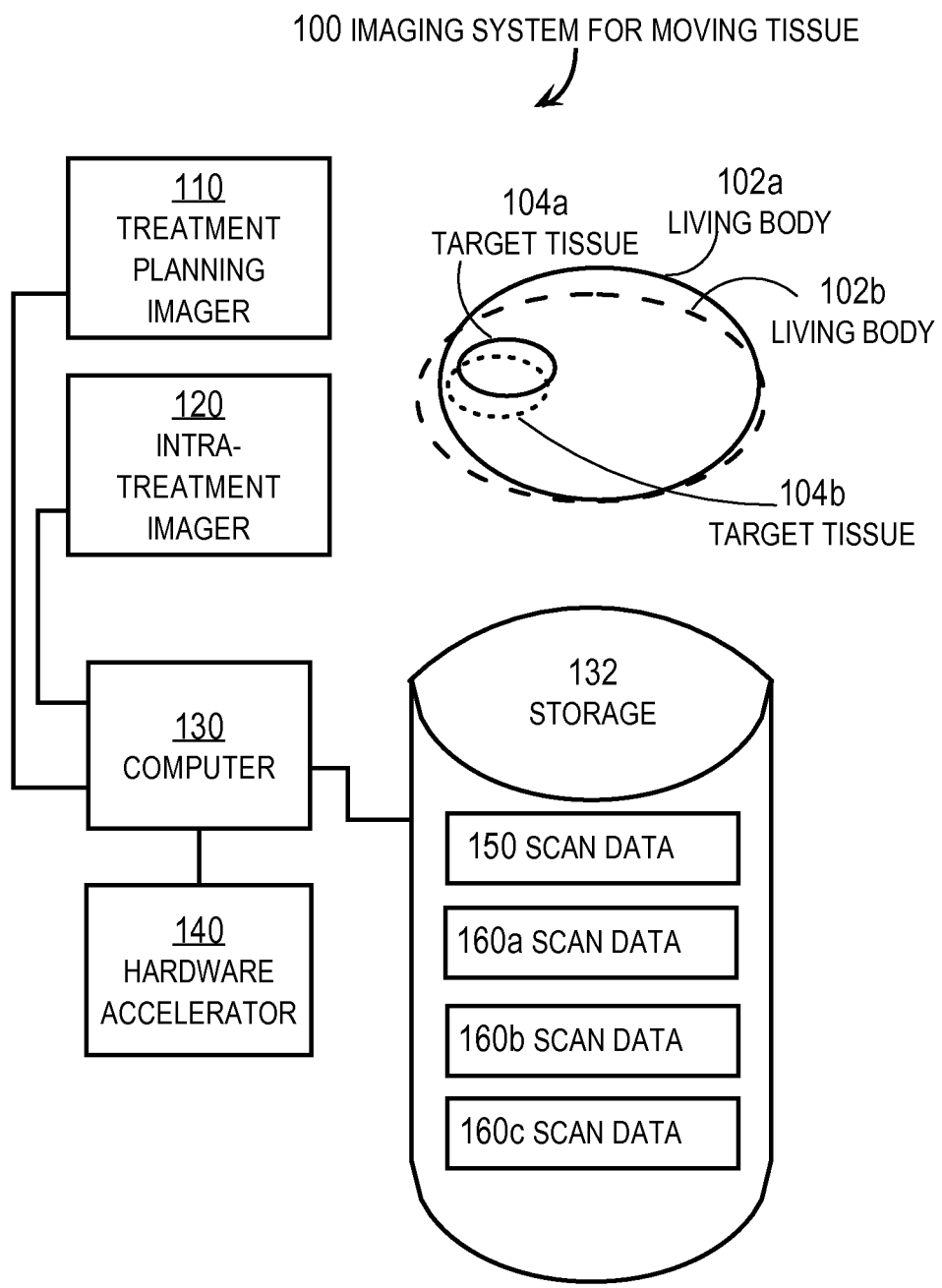
FIG. 1 is a block diagram that illustrates an imaging system for determining spatial arrangement of moving target tissue, according to an embodiment.

In the embodiments described herein, one scan is elastically registered to another scan using hardware acceleration in order to determine changes in soft tissue spatial arrangements over intra-treatment time scales. The general problem in this context is described herein with reference to FIG. 1. FIG. 1 is a block diagram that illustrates an imaging system 100 for determining spatial arrangement of moving target tissue, according to an embodiment. As used herein, moving target tissue is a tissue type within a living body that changes its spatial arrangement with time in a manner that is significant for directed treatment. It is not implied that the moving target tissue necessarily does or does not undergo any net translation.

The system 100 is for determining the spatial arrangement of soft target tissue in a living body. For purposes of illustration, a living body is depicted but is not part of the system 100. In the illustrated embodiment a living body is depicted in a first spatial arrangement 102a at one time and includes a target tissue in a corresponding spatial arrangement 104a. At a different time, the same living body is in a second spatial arrangement 102b that includes the same target tissue in a different corresponding spatial arrangement 104b.

In the illustrated embodiment, system 100 includes a treatment planning imager 110, such as a full dose CT scanner, a PET scanner or an MRI scanner, or some combination, and a different intra-treatment imager 120, such as a 3D ultrasound imager, a low dose CT scanner, or some combination. In some embodiments, the treatment planning imager 110 is also used as the intra-treatment imager and the different intra-treatment imager 120 is omitted.

In system 100, data from the imagers 110, 120 are received at a computer 130 and stored on storage device 132. Computer systems and storage devices like 130, 132, respectively, are described in more detail in a later section. Scan data 150, 160 based on data measured at imagers 110, 120 are stored on storage device 132. For example, high precision scan data 150 is stored based on measurements from treatment planning imager 110 and a set of intra-treatment scan data 160a, 160b, 160c collected at different times (and collectively referenced hereinafter as intra-treatment scan data 160) are also stored on storage device 132.

System 100 includes a hardware accelerator 140 for speeding one or more processing steps performed on scan data 150, 160, as described in more detail below. For example, hardware accelerator 140 is implemented as an application specific integrated circuit (ASIC) as described in more detail in a later section, or a field-programmable gate array (FPGA). The term logic circuits is used herein to indicate any arrangement of hardware (whether mechanical, electrical, optical, quantum or other) that performs a logical function.

In various embodiments of the invention, intra-treatment temporal changes in the spatial arrangements 104a, 104b of the target tissue are determined during treatment by performing elastic registration between treatment planning scan data 150 and intra-treatment scan data 160. A spatial component of a treatment plan developed for the treatment plan scan can then be adapted to the intra-treatment time by applying the same transformation that registers the treatment planning scan to the intra-treatment scan. In such cases, the intra-treatment scan is the reference scan and the treatment planning scan is the floating scan. That is, the position of treatment (such as a probe tip or radiation focus) based on the planning scan is transformed (floated) to the corresponding position based on the intra-treatment plan, the reference for the current time.

Although system 100 is depicted with a particular number of imagers 110, 120, computers 130, hardware accelerators 140 and scan data 150, 160 on storage device 132 for purposes of illustration; in other embodiments more or fewer imagers 110, 120, computers 130, accelerators 140, storage devices 132 and scan data 150, 160 constitute an imaging system for determining spatial arrangement of moving tissue.

FIG. 2A is a block diagram that illustrates scan elements in a 2D scan 210, such as one slice from a CT scanner. The two dimensions of the scan 210 are represented by the x direction arrow 202 and the y direction arrow 204. The scan 210 consists of a two dimensional array of 2D scan elements (pixels) 212 each with an associated position. A value at each scan element position represents a measured or computed intensity that represents a physical property (e.g., X-ray absorption) at a corresponding position in at least a portion of the spatial arrangement 102a, 102b of the living body. Although a particular number and arrangement of equal sized circular scan elements 212 are shown for purposes of illustration, in other embodiments, more elements in the same or different arrangement with the same or different sizes and shapes are included in a 2D scan.

FIG. 2B is a block diagram that illustrates scan elements in a 3D scan 220, such as stacked multiple slices from a CT scanner. The three dimensions of the scan are represented by the x direction arrow 202, the y direction arrow 204, and the z direction arrow 206. The scan 220 consists of a three dimensional array of 3D scan elements (voxels) 222 each with an associated position. A value at each scan element position represents a measured or computed intensity that represents a physical property (e.g., X-ray absorption or acoustic reflectivity) at a corresponding position in at least a portion of the spatial arrangement 102a, 102b of the living body. Although a particular number and arrangement of equal sized spherical scan elements 222 are shown for purposes of illustration, in other embodiments, more elements in the same or different arrangement with the same or different sizes and shapes are included in a 3D scan 220.

FIG. 2C is a block diagram that illustrates different scan elements in a 3D scan 230, such as from time-gated acoustic beams in a 3D acoustic scanner. The three dimensions of the scan are represented by the x direction arrow 202, the y direction arrow 204, and the z direction arrow 206. The scan 230 consists of a three dimensional array of 3D scan elements (voxels) 232 each with an associated position. In scan 230 nine beams penetrate the volume with increasing voxel size along the beam. For example, voxels 232a, 232b, 232c, 232d represent acoustic energy returned in a corresponding four time windows that represent propagation of sound through corresponding distance segments in the living body. Although a particular number and arrangement of spherical scan elements 232 are shown for purposes of illustration, in other embodiments, more elements in the same or different arrangement with the same or different sizes and shapes are included in a 3D scan 230. For example, 3D acoustic voxels expand in size in the x-z plane formed by x-direction arrow 202 and z-direction arrow 206 but remain constant in size in the y-direction arrow 204, unlike the voxels depicted. Four dimensional (4D) scans are generated by a time series of 3D scans. Higher dimensional scans are possible in some applications.

In the following, the term voxels is used interchangeably with the term scan elements to mean both voxels and pixels. Similarly the term images is used interchangeably with the term scans to mean 2D scans, 3D scans and higher dimensional scans. Certain voxels in the scan data are associated with the target tissue or treatment plan. The spatial arrangement of the target tissue or treatment plan is represented by the set of voxels that are associated with the target tissue or treatment plan, or by the boundary between such voxels and surrounding voxels.

In various embodiments of the invention, a pre-treatment scan formed by a 2D or 3D array of scan elements is processed to identify voxels associated with the target tissue or treatment plan. Treatment planning is based on this processing. The pre-treatment scan is elastically registered to a different scan formed by a 2D or 3D array of scan elements during treatment to determine the voxels associated with the target tissue or treatment plan in the second scan. In some embodiments, higher dimensional scans are elastically registered. In some embodiments, directed treatment is administered based on the elastic registration.

The elastic registration is performed in any manner known in the art. In some embodiments, the elastic registration is performed using adaptive sub-volume division as described in International patent application serial number PCT/US2006/033701, entitled Techniques for 3-D Elastic Spatial Registration of Multiple Modes of Measuring a Body, the entire contents of which are hereby incorporated by reference as if fully set forth herein. In some embodiments, a 3-D Chain Mail algorithm is used to perform the elastic registration while avoiding folding artifacts as described in U.S. patent application Ser. No. 11/609,458, filed Dec. 12, 2006 and entitled "Real-time Elastic Registration to Determine Temporal Evolution of Internal Tissues for Image-Guided Interventions" published as U.S. Pub. No. 2007/0167784 A1, the entire contents of which are hereby incorporated by reference as if fully set forth herein. In some embodiments, free form deformation (FFD) is used, in which arbitrary deformations at a small number of control points are interpolated to scan elements between control points. In general, automatic registration is performed by defining a measure of similarity between two scans and selecting a transform that maximizes the measure of similarity. Any known measure of similarity may be used. In several illustrated embodiments, the measure of similarity is called mutual information (MI), well known in the art. In some embodiments, a root-mean-square (rms) difference (MSD) is minimized to select the transform (e.g., the inverse MSD is the measure of similarity). In some embodiments, normalized mutual information (NMI), normalized cross correlation (NCC), and ratio image uniformity (RIU) are used as a measure of similarity, as described in more detail below.

In some embodiments, elastic transformations are implemented in whole or in part in hardware to speed the computation of the spatially dependent transforms. For example, as described in U.S. patent application Ser. No. 10/443,249 issued as U.S. Pat. No. 7,280,710 and Castro-Pareja I, fast memory and cubic addressing are used to store and access the two scans and determine and store a joint mutual histogram (MH) used in the computation of MI.

2. Method

FIG. 3 is a flow diagram that illustrates an elastic registration method 300 at a high level, according to an embodiment. Although steps are shown in FIG. 3 in a particular order for purposes of illustration, in other embodiments one or more steps in FIG. 3 may be performed in a different order or overlapping in time or omitted or changed in some combination of ways. For example, in a preferred embodiment, steps 320 and 340 to receive floating image scan data and reference image scan data, respectively, are performed before step 310 to receive the current image transformation matrix. Thus steps 320 and 340 are not repeated each time a new transformation matrix is received, as described in more detail below.

In the illustrated embodiment, method 300 includes steps 310, 320, 330, 340, 350, 360, 370, 380. Steps 310 through 350 constitute a functional group 302. In illustrated hardware embodiments, steps of functional group 302 are implemented as special purpose logic circuits, including field programmable gate arrays (FPGAs), rather than as instructions that cause one or more general purpose processors to perform certain steps in sequence.

Detailed embodiments of steps in method 300, which can be implemented in special purpose hardware, are described in the following sections. A particular embodiment of step 330 for transforming scan elements of the floating image, which can be implemented in hardware, is described in section 3.2. A particular embodiment of step 350 for computing a joint histogram of mutual information, which can be implemented in hardware, is described in section 3.3. Several embodiments of step 350 for deriving different measures of similarity from the joint histogram of mutual information, which can be implemented in hardware, are described in section 3.4.

In step 310, control point data for FFD elastic registration is received that indicates values of transformation parameters to transform certain control point locations in a reference frame to corresponding locations in a floating frame. The control points are often regularly spaced through the 2D or 3D reference scan. The transformation at each control point is typically a vector of three or more values corresponding to three or more parameters. The 2D or 3D array of such vectors is thus a matrix of transformations for control points regularly spaced in the control frame.

Figure 5A:
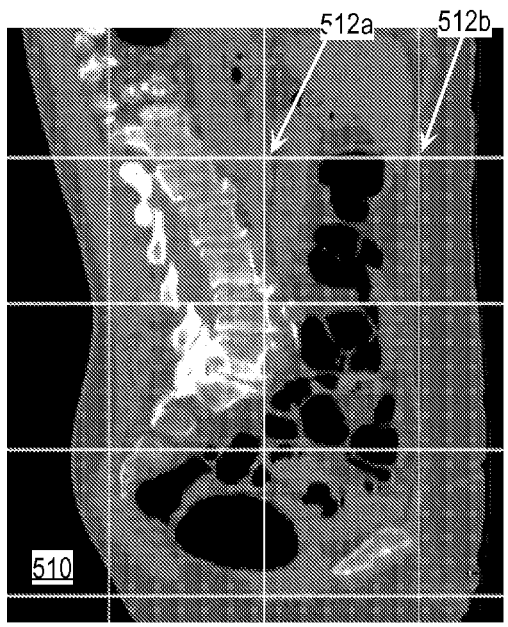
FIG. 5A is an image that illustrates an example scan of a human torso that includes control points for a reference image; according to an embodiment.
Figure 5B:
FIG. 5B is an image that illustrates an example scan of the human torso of FIG. 5A with tissue flexing to serve as a floating image that includes transformed control points; according to an embodiment.

FIG. 5A is an image that illustrates an example scan 510 of a human torso that includes FFD control points for a reference image; according to an embodiment. In the illustrated embodiment, the scan 510 is an intra-treatment scan. The FFD control points (e.g., 512a, 512b, and others collectively termed hereinafter as reference scan control points 512) are regularly spaced and define regularly-spaced grid lines. FIG. 5B is an image that illustrates an example scan 520 of the human torso of FIG. 5A with tissue flexing to serve as a floating image that includes transformed control points; according to an embodiment. In the illustrated embodiment, the scan 520 is a treatment planning scan. The FFD control points (e.g., 522a, 522b, and others collectively termed hereinafter as floating scan control points 522) are irregularly spaced and define irregularly spaced grid lines. Each floating scan control point, e.g., control points 522a, 522b, corresponds to a reference scan control point, e.g., 512a, 512b, respectively. Each reference control point, e.g., 512a, 512b, has vector ϕ of coefficients for a transform that describes the transformation of its position within the reference scan 510 to a position (e.g., 522*a*, 522*b*, respectively) within the floating scan 520.

In an illustrated embodiment, the vector of FFD control point transformation coefficients φ has three coefficients (also called parameters) which represent shifts in three Cartesian directions called x, y and z. The registration is elastic because the values of the parameters at different reference control points may be different. Such spatially varying shifts are called deformation fields. In other embodiments, the vector φ includes one or more other parameters, such as quaternion measures of angle that are more easily interpolated between control points than degrees or radians in each of three planes aligned with the Cartesian coordinates. In various embodiments, transformation parameters in vector φ include shear or scale changes or both.

Any method may be used to receive the matrix of transformation vectors for control points. In illustrated hardware embodiments, the data is passed from a computer-readable memory on a general purpose computer to a portion of memory on a set of one or more logic circuits that perform functional group 302.

In some embodiments using FFD, the displacements at the control points are interpolated to other scan elements to form an elastic registration. No further division of the scan into subvolumes is employed. In other embodiments, especially in embodiments that use volume subdivision, control points are not used. In some such embodiments, every voxel in a subvolume is transformed by the same linear transformation (different subvolumes use different linear transformations to provide an overall elastic transformation for the entire scan).

In step 320, scan data for the floating image is received. For example, scan data for treatment planning scan 520 is received. Any method may be used to receive the scan data for the floating image. In illustrated hardware embodiments, the data is passed from a computer-readable memory on a general purpose computer to a portion of memory on a set of one or more logic circuits that perform functional group 302. In embodiments using volume subdivision, only the scan elements in one subvolume are received during step 320

In step 330, positions of scan elements in the reference image are transformed to positions in the floating image based on the matrix of control point transformations.

In FFD, the transformations at the control points in the reference image are interpolated to the positions of the other scan elements in the reference image during step 330. In Castro-Pareja II, the well-known trilinear interpolation is used. This is simple and fast, but can cause kinks in spatial gradients of intensity at the control points. In some embodiments, B-spline interpolation is used to avoid kinks in spatial intensity gradients. As described in section 3.2, the use of B-splines for interpolating deformation fields has been done before and implemented for 2D scans on FPGA. However, the prior implementations are not sufficiently fast for processing of 3D scans in some embodiments. Improvements using a new memory access process are described in section 3.2 and implemented in hardware also described in section 3.2. The improvement involves processing the scan elements in a subset associated with a first control point before processing scan elements in a different subset. Then a whole plane of scan elements in the subset can be computed for each evaluation of a first term of the B-spline interpolation. The process also works in fewer and more dimensions than three.

Every scan element in the reference scan has a position indicated by coordinate values for a corresponding number of dimensions. Multiple subsets of contiguous scan elements in the reference scan are determined. Each subset of contiguous scan elements is associated with only one control point.

Figure 6:
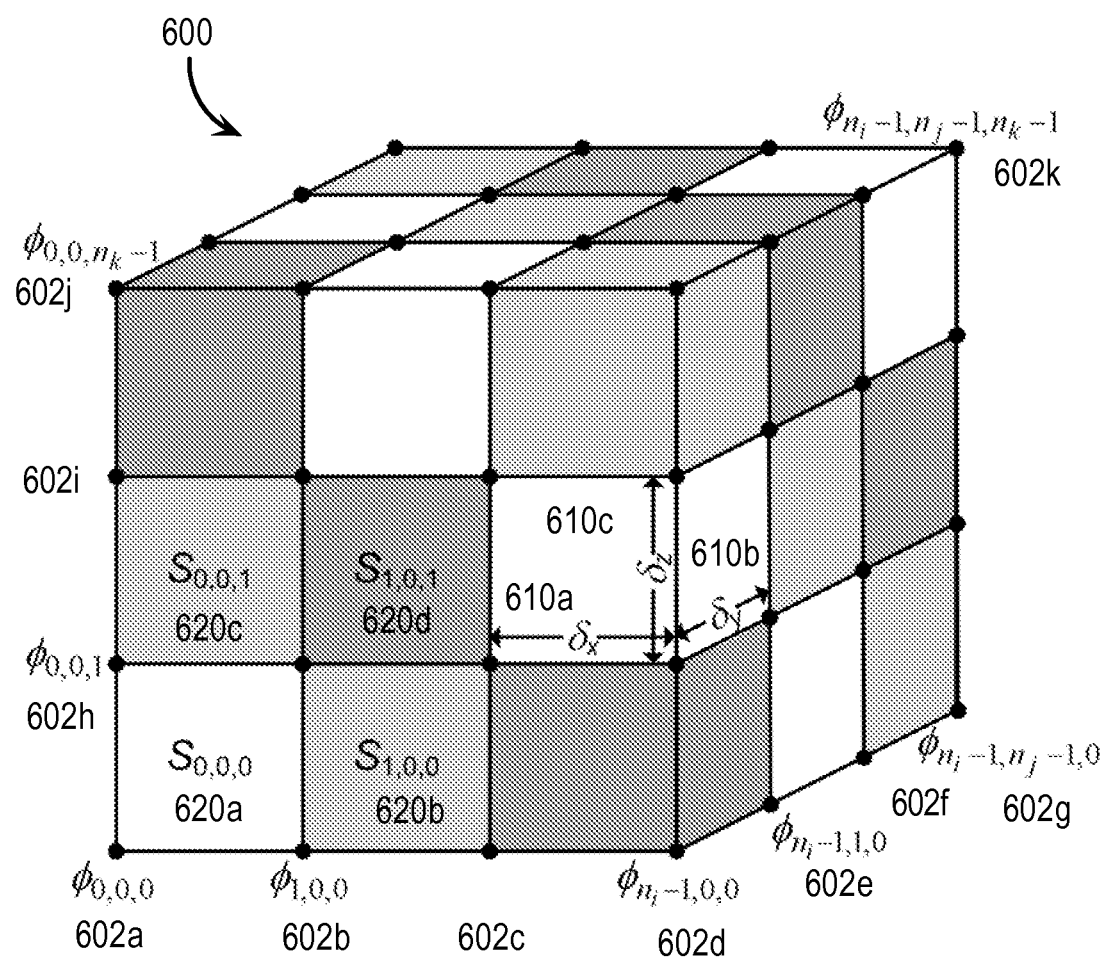
FIG. 6 is a block diagram that illustrates subsets of contiguous scan elements in a 3-D scan; according to an embodiment.

FIG. 6 is a block diagram that illustrates subsets of contiguous scan elements in a 3-D scan 600; according to an embodiment. Scan 600 includes control points 602*a*, 602*b*, 602*c*, 602*d*, 602*e*, 602*f*, 602*g*, 602*h*, 602*i*, 602*j* among others, collectively termed hereinafter control points 602. There are ni, nj and nk control points 602 in the first, second and third dimensions, respectfully, at a particular level of subdivision. In the illustrated embodiment ni=nj=nk=4, but in other embodiments and other levels of subdivision, more or fewer or different numbers of control points are used in each dimension. The distance between adjacent control points in the first, second and third dimension is represented by the symbols δx 610*a*, δy 610*b*, δz 610*c*, respectively, at the illustrated level of subdivision. In FIG. 6, control points 602*a*, 602*b*, 602*c*, 602*d* advance along one dimension at a bottom front of the 3D scan, increasing a coordinate value of a first dimension and sharing common coordinate values (e.g., 0, 0) of a second and third dimension. Control points 602*d*, 602*e*, 602*f*, 602*g* advance along a second dimension at the right bottom edge of the 3D scan, increasing a coordinate value of that second dimension and sharing common coordinate values (e.g., ni−1, 0) of a first and third dimension. Control points 602*a*, 602*h*, 602*i*, 602*j* advance along a third dimension at the left front edge of the 3D scan, increasing a coordinate value of that third dimension and sharing common coordinate values (e.g., 0, 0) of a first and second dimension.

Defined by adjacent control points in each of the three dimensions is a volume with 8 control points. In the volume between the 8 control points is a subset of scan elements. In the illustrated embodiment, each of these subsets is named by the coordinates of its lower front left corner. The 3D scan 600 includes subsets S000 620*a*, S100 620*b*, S001 620*c* and S101 620*d*, among others, collectively termed hereinafter as subsets 620.

An output vector v of values for transform parameters for each scan element in a first subset of scan elements of the reference scan is provided during step 330. This includes determining a first cubic B-spline coefficient coef1=ΣB(w1) φ for a first coordinate value of a scan element in the first subset. The first coordinate is a distance w1 from a control point along a first dimension. Values for w1 are also determined for three other control points in the first dimension and the four products are summed to determine coef1. B(n) is a well known function for contributions at an arbitrary point from a control point at a normalized distance n=d/s where d is the distance from the control point to the arbitrary point and s is the separation of adjacent control points that straddle the arbitrary point.

For the first value of coef1, multiple cubic B-spline coefficients coef2=ΣB(w2)*coef1 are determined for a corresponding set of coordinate values of scan elements in the first subset, each a distance w2 from a control point along the second dimension. Values for w2 are also determined for three other control points in the second dimension and the four products are summed to determine coef2. In an illustrated embodiment, all the second coordinate positions in the subset in the second dimension are determined before changing the first coordinate.

This method saves different evaluations of coef1 for every different evaluation of coef2, and leads to substantial speedup when implemented in a hardware pipeline as reported in section 3.2. The transform vector v at the arbitrary point in the first subset is equal to coef2 for two dimensions and is based on coef2 and multiple evaluations of a coef3 for three dimensions.

Pre-computation of the coef1 and coef2 coefficients for calculating of the local deformations of voxels in a given row in a given scan to accelerate the performance of software implementation was previously proposed in a different order. FIG. 7A is a block diagram that illustrates sequential order for calculating interpolation coefficients between control points in subsets depicted in FIG. 6, according to one embodiment using the previously proposed order. The interpolation of scan elements are performed in order along the paths shown by solid lines 710 before those shown by dashed lines 712 followed by lines 714 and 716. FIG. 7A shows standard scan access order: first (bottom) row for all columns (left to right) in scan then for all planes (front to back) in scan, then second row for all columns in scan then for all planes in scan. This sequence is called scan row-column-plane order. FIG. 7B is a block diagram that illustrates sequential order for calculating interpolation coefficients between control points in subsets depicted in FIG. 6, according to a different embodiment. Again, the interpolation of scan elements are performed in order along the paths shown by solid lines 720 before those shown by dashed lines 722 followed by lines 724 and 726. In the illustrated embodiment, coef1 and coef2 coefficients are pre-computed in subset row-column-plane order. In this order, first (bottom) row for all columns (left to right) in subset then for all planes (front to back) in subset, then second row for all columns in subset then for all planes in subset. After the first subset is interpolated, then interpolation is started for the second subset. An advantage of the proposed access order is that it minimizes the number of evaluations of equations and allows a more efficient hardware implementation of the interpolation, including parallel implementation, as described in more detail in section 3.2.

Although regularly spaced control points and vector $\phi$ with three shifts and three dimensions are described here and in section 3.2, in other embodiments, vector $\phi$ has more or different transformation parameters, control point spacing is only approximately regular and the method is applied in a different number of dimensions.

In some embodiments, especially in embodiments that use volume subdivision, every voxel in a subvolume is transformed by the same linear transformation during step 330; and no interpolation of transformations is done until after the very last level of volume subdivision.

In step 340, scan data is received for a reference image. Any method may be used to receive the scan data for the reference image. In illustrated hardware embodiments, the data is passed from a computer-readable memory on a general purpose computer to a portion of memory on a set of one or more logic circuits that perform functional group 302. In embodiments using volume subdivision, only the scan elements in one subvolume are received during step 340.

In step 350 a similarity measure is determined between the reference image and the corresponding scan elements in the floating image. In some embodiments using FFD, the interpolated transform is used to find the scan elements of the floating image that correspond to each scan element in the reference image. In some embodiments using volume subdivision, the same linear transform is used to find the scan elements of the floating image that correspond to each scan element in the reference image. In either case, the scan element from the reference image does not align perfectly with one scan element of the floating image but falls between multiple scan elements of the floating image. The floating image scan elements that surround the corresponding location are then all used to determine an intensity to compare to the intensity of the scan image for purposes of the similarity measure. In 2D images, there are typically four scan elements that are combined in a weighted average, in 3D images there are typically eight scan elements that are combined in a weighted average. Any method to perform this combined weighting may be used, such as the partial volume interpolator described by Castro-Pareja II.

Also during step 350, a joint mutual histogram is determined. In some embodiments using a volume subdivision method of elastic registration, the joint histogram is determined as described in section 3.3, using a local joint histogram for a subvolume and a remainder joint histogram for other subvolumes based on a joint histogram from previous level of volume subdivision.

In this method, a two dimensional first joint histogram (called a "prior" joint histogram in section 3.3) of mutual information based on the reference scan data and the floating scan data at a previous level of volume subdivision is determined. The joint histogram indicates a number of the scan elements that have intensity values based on the reference scan in a first range of intensities and have corresponding intensity values based on the floating scan in a second range of intensities. At the current level of volume subdivision, a subset of contiguous scan elements of the plurality of scan elements is determined to be a subvolume. A local joint histogram of mutual information is determined based on the reference scan data and the floating scan data for the subvolume. A remainder joint histogram (called a "rest" joint histogram in section 3.3) of mutual information is determined by subtracting the local joint histogram from the first ("prior") joint histogram. A value for a similarity measure, based at least in part on the remainder joint histogram, is determined for a second transformation for mapping coordinates of the control points from the first scan to coordinates of control points in the second scan.

Also during step 350, a measure of similarity or a value used in a measure of similarity is determined. In Castro-Pareja II, mutual information is computed in hardware during step 350 and passed to a general purpose computer for the following steps. As described in section 3.4, other measures of similarity can also be computed from the joint histogram, such as the joint histogram already produced in hardware in the illustrated embodiments.

As described in section 3.4, other measures that can be derived from the joint histogram include normalized mutual information (NMI), normalized cross correlation (NCC), mean-square difference (MSD) of intensities, and ratio image uniformity (RIU).

Except for normalized mutual information, these other measures have not before been derived from the joint histogram of mutual information. And normalized mutual information has not been available from prior hardware implementations of the joint histogram of mutual information.

The determination of MI and NMI from the mutual information histograms is described by Equations 9 through 16 in section 3.4. The determination of NCC from the mutual information histograms is described by Equations 20 through 24 in section 3.4. The determination of MSD intensities from the mutual information histograms is described by Equation 26 in section 3.4. The determination of RIU from the mutual information histograms is described by Equations 29 through 30 in section 3.4.

In step 360, it is determined if the new matrix is optimal based on a similarity measure equal to or based on the value provided during step 350. Any method may be used. For example, in some embodiments, the new matrix is considered optimal if it produces a measure of similarity that is not substantially different than the measure of similarity produced by a prior transformation matrix. In some embodiments, the new matrix is considered optimal if it produces a measure of similarity greater than a particular threshold.

If it is determined in step 360 that the matrix is optimal, then control passes to step 380. In step 380 the matrix, or the transformed floating image, or a transformed treatment plan, or some combination, is output.

If it is determined in step 360 that the matrix is not optimal, then control passes to step 370. In step 370, a new transformation matrix is determined based on the similarity measure equal to or based on the value provided during step 350. Any method may be used to determine the new transformation matrix. Many algorithms are available for determining a different transformation matrix from a prior transformation matrix and a measure of similarity obtained by applying the transformation matrix, such as those described in Castro-Pareja I and Castro-Pareja II. The current matrix is set equal to the new matrix and control passes back to step 310 and following to determine a measure of similarity for the new transformation matrix.

3. Apparatus

In an illustrated embodiment, all the improvements described for functional group 302 are implemented in hardware. In other embodiments, fewer than all the improvements described for functional group 302 are implemented in hardware.

3.1 Overview

FIG. 4 is a block diagram that illustrates component blocks of an apparatus 400 for accelerated elastic registration of two scans, according to an embodiment. In various embodiments, any, all, or a portion of each block is performed by electronic components of an integrated circuit or any other electrical, optical, quantum or mechanical component with sufficient response time for intra-treatment elastic registration, including a programmed field-programmable gate array (FPGA). In some embodiments, one or more of the components shown are omitted or replaced by a general purpose processor executing instructions stored on a computer-readable medium.

Apparatus 400 includes a voxel coordinate transformation unit 410, an image data transfer unit 420, a mutual information histogram accumulator 430, similarity measures accumulators 450 and output registers 460.

The voxel coordinate transformation unit 410 performs steps 310 and 330 of method 300. In the illustrated embodiment, unit 410 includes a linear transformation unit 412, a control point grid memory 416, an elastic transformation unit 414 and an adder 418.

The linear transformation unit 412 applies a global affine transformation between scan elements of the reference scan and the floating scan. First order differences between the scan are removed by the global affine transformation. Any apparatus known in the art may be used for the linear transformation unit 412, such as the units described in Castro-Pareja I and Castro-Pareja II. For some embodiments, especially volume subdivision embodiments, only the linear transformation unit 412 is included in voxel transformation unit 410.

The control point grid memory 416 stores the transformation matrix of transformation vectors φ at control points, as described in section 3.2, for embodiments using FFD and B-splines. In an illustrated embodiment, the contents of memory 416 are loaded by a general purpose processor executing instructions for step 370. The control point grid memory 416 performs step 310 of receiving current image transformation matrix for control points. In some embodiments, especially volume subdivision embodiments, control point grid memory 416 is omitted.

The elastic transformation unit interpolates the transformation vectors of the control point grid memory onto each scan element position of the reference scan. For example, in some cases the interpolation is to an array of 256 by 256 by 256 of x, y, z positions of a 3D reference scan. In some embodiments, the interpolation is to a smaller 3D array, e.g. 256 by 256 by 64 or 64 by 64 by 16 or even a 2D array, e.g., 256 by 256. In some embodiments, especially volume subdivision embodiments, elastic transformation unit 414 is omitted.

According to an illustrated embodiment, the elastic transformation unit 414 performs the functions described in section 3.2 and efficiently retrieves control points and performs a B-spline interpolation to efficiently fill the scan space with interpolated transformation vectors v. An arrangement of sub block inelastic transformation unit 414 according to an embodiment is described in section 3.2 with reference to FIG. 8.

The adder 418 adds the elastic transformations interpolated to each scan position by elastic transformation unit 414 to the global affine transformation from the linear transformation unit 412. The output from adder 418 is the total transformation used to find a location in the floating scan that corresponds to each scan element in the reference scan. This information is fed to three components in the image data transfer unit 420. In some embodiments, especially volume subdivision embodiments, adder 418 is omitted.

In an illustrated embodiment, the voxel coordinate transformation unit 410 sweeps through each scan element of a reference scan and sends the net transformation for that scan element to locate a corresponding position in the floating scan In another illustrated embodiment using volume subdivision, the voxel coordinate transformation unit 410 sends the same net transformation for every scan element in the subvolume to locate a corresponding position in the floating scan.

The image data transfer unit 420 includes a reference image memory 421, a floating image memory 422, a reference image controller 423, a floating image controller 424 and a partial volume interpolator 428. The image data transfer unit 420 retrieves the intensity values of each reference scan element and one or more intensity values of floating scan elements in the vicinity of that reference scan element after transformation.

The reference image memory 421 stores the reference scan data as intensity values in an array that corresponds to the scan elements. In an illustrated embodiment, the contents of memory 421 are loaded by a general purpose processor executing instructions. The reference image memory 421 receives the scan data for the reference image during step 340 of method 300. Similarly, the floating image memory 422 stores the floating scan data as intensity values in an array that corresponds to the scan elements of the floating image. In an illustrated embodiment the contents of memory 422 are loaded by a general purpose processor executing instructions. The floating image memory 422 receives the scan data for the floating image during step 320 of method 300. The reference image controller 423 and floating image controller 434 retrieve intensity values for corresponding scan elements from the two scans based on the transform received from unit 410. In general, for 3D scans, the floating image controller 424 retrieves all floating scan elements that surround each transformed reference scan element position. The partial volume interpolator 428 determines a weight for each of eight floating scan elements that surround the transformed position of a particular reference scan element (4 weights in 2D scans). The information from the image controllers 423, 424 and partial volume interpolator 428 is fed to the mutual information histogram accumulator 430.

In some embodiments, each of these components of unit 420 is the same as described in Castro-Pareja I and Castro-Pareja II. In some embodiments, floating image memory 422 is implemented in one Synchronized Dynamic Random Access Memory (SDRAM) dual in-line memory module (DIMM) with 64-bit addressing as opposed to 4 SRAM buses with cubic addressing. Cubic addressing, as described in Castro-Pareja II is performed by saving a 2 by 2 voxel neighborhood at each 32-bit memory location; so that loading a three dimensional 2 by 2 by 2 voxel neighborhood requires two memory accesses to consecutive memory locations.

The mutual information histogram accumulator 430 includes a scheduler/controller 432, a voxel counter/divider 434, a joint histogram accumulator 440 and an individual histogram accumulator 436. The mutual information histogram accumulator 430 determines the intensity of each reference scan element and the weighted intensities of the surrounding corresponding floating scan elements provided by the image data transfer unit 420 and creates a histogram of the number of voxels in each combined intensity range.

The scheduler/controller 432 determines which counters to increment. Each new voxel of the reference image is used to increment the voxel counter 434. The voxel counter also determines the reciprocal of the voxel count for efficient multiple multiplies instead of divides at later stages. A particular reference scan element intensity is used to determine a reference intensity range bin. That bin is indicated to the individual histogram accumulator 436 which increments the counter in that range bin for the reference scan histogram. A set of neighboring floating scan element intensities are used to compute a corresponding floating scan intensities. The corresponding floating scan element intensities are used to determine floating intensity range bins. Those bins are indicated to the individual histogram accumulator 436 which increments the counter in that range bin for the floating scan histogram by the associated weight. The reference and floating range bins are indicated to the joint histogram accumulator 440 which increments the counters corresponding to those combinations of range bins by the associated weights. The information from the voxel counter/divider 434 and histogram accumulators 436, 440 is fed to the similarity measures accumulators 450.

According to some embodiments, joint histogram accumulator 440 implements the techniques of section 3.3 when the elastic transformation is determined by volume subdivision. As described in section 3.3, when an elastic transformation determined with a certain number of subvolumes is refined by subdividing each subvolume, the joint histogram for a newly transformed subvolume is combined with the joint histogram for the other subvolumes from the previous transformation. Rather than re-compute the joint histogram for each subvolume, the joint histogram from the prior transformation is stored, the joint histogram from the new subvolume (the local joint histogram) is subtracted from the prior joint histogram to form a remainder joint histogram (also called in section 3.3 a rest joint histogram). Then after the subvolume is transformed with a new transformation, a new local joint histogram is computed and combined with the rest joint histogram to produce the total joint histogram for the newly transformed subvolume. The speedup is substantial, as indicated in section 3.3. Thus, in these embodiments, the joint histogram accumulator includes registers that store a prior joint histogram 442, a local joint histogram 444, and a remainder joint histogram 446. In elastic interpolation embodiments, such as some embodiments using B-splines, prior joint histogram 442, local joint histogram 444, and remainder joint histogram 446 are omitted.

Formerly, the similarity measures accumulator was simply a mutual information accumulator that determined the non-normalized mutual information based on a difference between a sum of individual entropies and a joint entropy determined from the individual and joint histograms and voxel counter.

According to the illustrated embodiment, the similarity measures accumulator 450 includes a scheduler/controller 451, a joint entropy accumulator 452, an individual entropy accumulator, a ratio image uniformity (RIU) accumulator 454, a normalized cross correlation (NCC) accumulator 456, and a mean square difference (MSD) intensity accumulator 458. All these measures are computed from the same data produced by the mutual information histograms accumulator 430, as described in section 3.4. In other embodiments one or more of accumulators 452, 453, 454, 456, 458 are omitted.

The scheduler/controller 451 determines which accumulators 452, 453, 454, 456, 458 to feed mutual information histograms. In some embodiments, all present accumulators of accumulators 452, 453, 454, 456, 458 are automatically fed and scheduler/controller 451 is omitted. The outputs of all fed accumulators are placed in output registers 460.

The joint entropy accumulator and individual entropy accumulator are separate so that either a mutual information (MI) or normalized mutual information (NMI) may be used as a measure of similarity in step 360 based on contents of registers 460. Hardware elements of the MI accumulator 452 and NMI accumulator 453 are described with reference to FIG. 10D in section 3.4. Hardware elements of the RIU accumulator 454 are described with reference to FIG. 10A in section 3.4. Hardware elements of the NCC accumulator 456 are described with reference to FIG. 10B in section 3.4. Hardware elements of the MSD accumulator 458 are described with reference to FIG. 10C in section 3.4.

3.2 Accelerated Interpolation

There are several different ways to interpolate a deformation field in FFD elastic registration. A widely used method models the deformation field using B-splines. Among the known advantages of B-splines are their finite volume of support, and their ability to produce smooth transitions in the deformation field. The value of the deformation field at a given coordinate is calculated using a linear combination of cubic B-splines placed on a regular grid of $n_i \times n_j \times n_k$ control points $\phi_{i,j,k}$, with $i<n_i$, $j<n_j$, $k<n_k$ and grid spacing $\delta_x$, $\delta_y$, and $\delta_z$. The B-splines model is defined by Equation 1 and Equation 2.

$$\vec{v}_{local}(x, y, z) = \sum_{l=-1}^{2} \sum_{m=-1}^{2} \sum_{n=-1}^{2} B(u)B(v)B(w)\phi_{i+l,j+m,k+n} \quad (1)$$

where $i = \lfloor x/\delta_x \rfloor$, $j = \lfloor y/\delta_y \rfloor$, $k = \lfloor z/\delta_z \rfloor$,
$u = x/\delta_x - i$, $v = y/\delta_y - j$, $w = z/\delta_z - k$.

$$B(r) = \begin{cases} 3/6 \cdot r^3 - r^2 + 4/6, & r < 1 \\ -1/6 \cdot r^3 - r^2 - 2 \cdot r + 8/6 & 1 \leq r < 2 \\ 0 & r \geq 2 \end{cases} \quad (2)$$

Implementing a 3D cubic interpolation pipeline in an FPGA poses several challenges. First of all, to interpolate a given point in a three-dimensional space using cubic interpolation, 64 control point locations are needed (the $\phi_{i,j,k}$ vectors in Equation 1), which involves accessing 64×3 values from internal memory. Given 64 control point locations and their corresponding interpolation weights, at least 84×3 multiplications are needed (i.e., 84 multiplications are needed for each of the x, y and z dimensions), as below. To achieve optimal performance, the pipeline should be able to achieve a throughput of one interpolated value per clock cycle. Such a constraint implies that all operations should be performed in parallel. A prior art pipeline achieved a throughput of one result per 64 clock cycles by employing an iterative method that cycles through all the control points sequentially, one at a time for each interpolated voxel. The cubic interpolation pipeline presented here achieves a throughput of one result per clock cycle by exploiting an extension of the optimizations to cubic interpolation. These optimizations minimize the number of arithmetic operations required to interpolate a sequence of consecutive voxel coordinates lying on a uniform rectangular grid and allow using a set of hardware resources small enough to be implemented in a single FPGA as part of the image transformation component of the FAIR-II architecture of Castro-Pareja II.

This section presents an algorithm for interpolating the deformation field values, which is suitable for an efficient implementation in a hardware pipeline. The nomenclature is illustrated in FIG. 6, described above. Given an image space I(x,y,z) (e.g., scan 600) and an underlying regular grid of values $\phi_{i,j,k}$ at control points 602 with $i<n_i$, $j<n_j$, $k<n_k$ and grid spacing $\delta_x$, $\delta_y$, and $\delta_z$ (in voxels), the grid divides the space I(x,y,z) into a set S of $(n_i-1) \times (n_j-1) \times (n_k-1)$ scan element subsets $S_{i,j,k}$, each with dimensions $\delta_x \times \delta_y \times \delta_z$ voxels. Each $S_{i,j,k}$ is therefore defined as $S_{i,j,k} = \{(x,y,z),$ where $x \in [i \cdot \delta_x, (i+1) \cdot \delta_x[, y \in [j \cdot \delta_y, (j+1) \cdot \delta_y[$ and $z \in [k \cdot \delta_z, (k+1) \cdot \delta_z[\}$.

When using cubic interpolation, a given control point has a volume of support of size $4\delta_x \times 4\delta_y \times 4\delta_z$, therefore spanning 64 subsets. Optimizing the values of the deformation field at a given control point involves maximizing the similarity of a region $R_{i,j,k}$ in the reference image that includes at least the volume of support of the control point and its corresponding region in the floating image (i.e., $R_{i,j,k} \supset S_{ii,jj,kk}$ for $i-2 \leq ii < i+2, j-2 \leq jj < j+2$ and $k-2 \leq kk < k+2$). Many algorithms optimize several control points at the same time, thus calculating at each iteration the transformed coordinates of either the whole image or a region that includes the volume of support of all voxels being optimized.

Assuming that the boundaries of $R_{i,j,k}$ are defined along subvolume boundaries, the process of calculating the floating image coordinates corresponding to each reference image voxel in $R_{i,j,k}$ can be performed in the following manner:

For each $S_{ii,jj,kk} \subset R_{i,j,k}$, for each z in $S_{ii,jj,kk}$, for each y in $S_{ii,jj,kk}$, for each x in $S_{ii,jj,kk}$, evaluate Equation 1.

Performing the transformation in such order allows for an efficient implementation of the cubic interpolation pipeline using the following variation of Equation 1 expressed in Equation 3.

$$\vec{v}_{local}(x, y, z) = \sum_{l=-1}^{2} B(u) \sum_{m=-1}^{2} B(v) \sum_{n=-1}^{2} B(w) \phi_{i+l,j+m,k+n} \quad (3)$$

Since all $\delta_x \times \delta_y \times \delta_z$ voxels within a given $S_{ii,jj,kk} \in S$ are in the volume of support of the same set of control points $\phi_{i+1,j+m,k+n}$ the control point memory needs to be accessed only once for the whole subvolume. The algorithm can therefore be written as follows.

For each z in $S_{ii,jj,kk}$, $$\text{calculate } coefz_{l,m} = \sum_{n=-1}^{2} B(w) \phi_{ii+l,jj+m,kk+n} \quad (4)$$

for each y in $S_{ii,jj,kk}$, $$\text{calculate } coefz_l = \sum_{m=-1}^{2} B(v) coefz_{l,m} \quad (5)$$

for each x in $S_{ii,jj,kk}$, $$\text{calculate } \vec{v}_{local}(x, y, z) = \sum_{l=-1}^{2} B(u) coefy_l \quad (6)$$

This algorithm involves $64 \times 3$ multiplications to calculate the set of $16 \times 3$ coefz coefficients corresponding to a given plane within a given subvolume. However, those coefficients are shared by all the $\delta_x \times \delta_y$ voxels in the same plane. Therefore, the $64 \times 3$ multiplications can be performed over a period of $\delta_x \times \delta_y$ clock cycles without affecting the pipeline throughput. For grids with spacing larger than eight voxels in the x and y directions (a valid assumption in most applications), this means that Equation 4 can be calculated using only three multipliers (one for each dimension). A similar reasoning can be applied to calculating the $4 \times 3$ coefy coefficients as per Equation 5. In this case, $16 \times 3$ multiplications need to be performed over a period of $\delta_x$ clock cycles. Assuming again a minimum grid spacing of eight voxels, six multipliers are needed (two per dimension). Equation 6 can be calculated once per clock cycle, therefore requiring twelve multipliers to be implemented (four per dimension). The total number of required multipliers is therefore 21, which is a realistic number for FPGA implementation.

Figure 8:
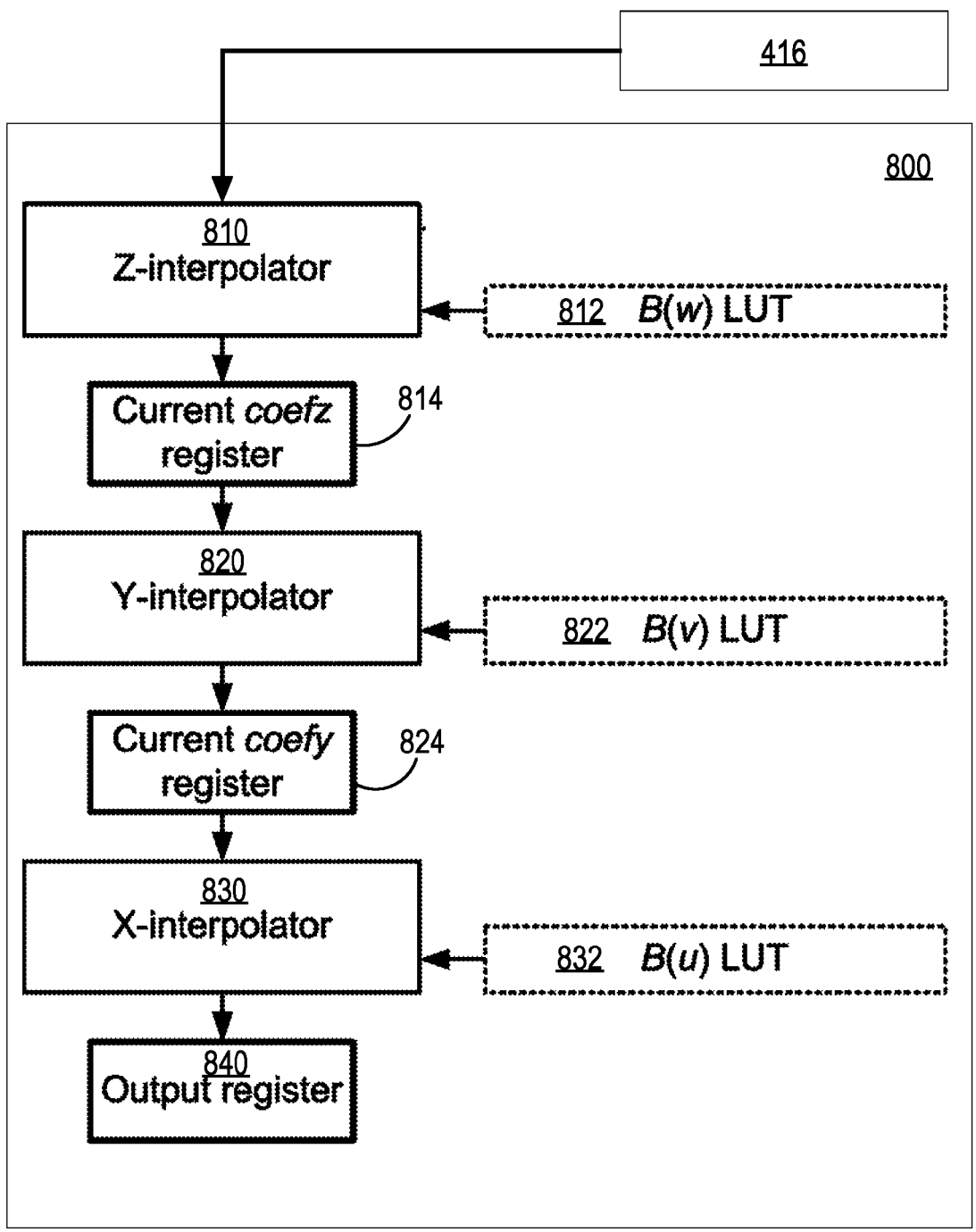
FIG. 8 is a block diagram that illustrates component blocks of a logic circuit for calculating interpolation coefficients between control points, according to the embodiment of FIG. 7B.

FIG. 8 is a block diagram that illustrates component blocks of a logic circuit 800 for calculating interpolation coefficients between control points, according to the embodiment of FIG. 7B. The logic circuit 800 includes a Z interpolator block 810, a current coefz register 814, a Y interpolator block 820, a current coefy register 824, an X interpolator block 830, an output register 840, and three look up tables (LUTs) 812, 822, 832. The Z interpolator 810 determines the normalized distance w from a control point in the z direction and obtains the value of the well known B-spline kernel for the z dimension, i.e., B(w), from a first LUT called the B(w) LUT 812. The Z interpolator then determines coef1 using Equation 4 and stores it in the coefz register 814. The Y interpolator 820 determines the normalized distance v from a control point in the y direction and obtains the value of the well known B-spline kernel for the y dimension, i.e., B(v), from a second LUT called the B(v) LUT 822. The Y interpolator 820 then determines coef2 using Equation 5 and stores it in the coefy register 824. The X interpolator 830 determines the normalized distance u from a control point in the x direction and obtains the value of the well known B-spline kernel for the x dimension, i.e., B(u), from a third LUT called the B(u) LUT 832. The X interpolator 830 then determines coef3 using Equation 6 and stores it in the output register 840.

At a given time, the X-interpolator calculates the total deformation vector for a given voxel using as input the previous outputs of the Y-interpolator, which are stored in the coefy register. In a similar way, the Y-interpolator calculates concurrently the coefficients for the next row using as inputs the previous outputs of the Z-interpolator, while the Z-interpolator calculates the coefficients for the next plane. Once the X-interpolator finishes a row, the values in the coefy register are updated by loading the current outputs of the Y-interpolator. When the Y-interpolator calculates the coefficients for the last row in a given plane, the values in the coefz register are updated by loading the current outputs of the Z-interpolator.

The basis function coefficients B(r) are pre-calculated and stored in lookup tables (LUTs). The benefits of using LUTs at each stage to calculate the basis function coefficients include a compact implementation and the ability to support different interpolation kernels through simple uploading of the corresponding coefficients into internal memory for the LUTs. Most medical images have a maximum size of 512 voxels per dimension. Because at least four neighborhoods are involved along each dimension to perform cubic addressing, a reasonable maximum neighborhood size is 128 voxels per dimension. For such a maximum neighborhood size the corresponding number of entries in the LUTs is 128, which is appropriate for implementation using internal memory. For cubic interpolation of a given point, four basis function coefficients are needed. Four LUTs are therefore needed in each of the X-, Y- and Z-interpolators.

The control point grid memory 416 stores the local shifts at each control point location. It is directly accessed by the Z interpolator. Accesses to the control point grid memory are non-sequential in nature and should be performed at the pipeline clock rate for optimal performance. Such constraints disfavor the use of dynamic memories, which are optimized for sequential burst accesses and have relatively long random access times. A good choice is to implement the control point grid memory 416 using SRAMs, which can be internal or external to the FPGA depending on the resource availability for various embodiments. The width of the control point grid memory is $3n_{cp}$ bits, where $n_{cp}$ is the number of bits used to store each component of the local shift at a control point location. Each component is a fixed-point value with an integer and a fractional part. The necessary width of the integer part is application-dependent and determines the dynamic range of the possible local deformations. The width of the fractional part determines the sub-voxel accuracy of the local deformations.

Boundary conditions involve special treatment. There are many different solutions to the problem of interpolating local deformation values in the subsets that lie on the boundaries of the image. One solution is to perform tri-linear interpolation near the boundaries instead of cubic interpolation. This solution, although simple and efficient in software implementations, requires an extra tri-linear interpolation pipeline in hardware, thus making it more expensive to implement. The second solution is to add control points that lie beyond the image boundaries. This solution allows better estimation of the deformation field at the expense of a larger control point grid memory size. A third solution that does not increase the hardware or memory requirements significantly is to assume that the deformation values of the control points beyond the image boundaries are equal to their closest control point on the image boundary. Implementing this case requires a simple truncation of the address used to access the control point grid memory and is therefore more practical in hardware implementations.

To minimize hardware requirements in some embodiments, the arithmetic pipeline uses fixed-point arithmetic. The range of the basis function coefficients is between zero and one, thus making a fixed-point representation sufficient. The accuracy of the interpolated deformation field values depends directly on the number of bits used to store the basis function coefficients and the number of bits used to store the fractional component of the control point values. Table 1 shows the interpolation accuracy in voxels for different combinations of both. To achieve interpolation accuracy close to the accuracy of control point values stored in memory, the number of bits used to store basis function coefficients should be larger than the number of bits in the fractional component of the control point values.

TABLE 1

Interpolation accuracy for different numbers of bits in the fractional part of control point values and in the basis function coefficients.

| Bits in the fractional part of control point values | Interpolation accuracy for different basis function coefficient bits (voxels) | | | |
|---|---|---|---|---|
| | 7 | 8 | 9 | 10 |
| 1 | 0.250 | 0.250 | 0.250 | 0.250 |
| 2 | 0.125 | 0.125 | 0.125 | 0.125 |
| 3 | 0.063 | 0.063 | 0.063 | 0.063 |
| 4 | 0.033 | 0.032 | 0.032 | 0.031 |
| 5 | 0.018 | 0.016 | 0.016 | 0.016 |

The pipeline was implemented in a Tsunami PCI board (SBS Technologies, Albuquerque N. Mex.) with an Altera Stratix EP1S40 FPGA as part of the automated image registration architecture presented in Castro-Pareja II. Logic cell and digital signal processor (DSP) block (internal multiplier) consumption were 14% and 50% respectively for the cubic interpolation pipeline. Two internal 512 Kb RAM blocks were used to store the control point values. The basis function coefficient LUTs were implemented using internal 4 Kb RAM blocks with 9-bits per coefficient. Only one 4 Kb RAM block was necessary to implement the four LUTs corresponding to each of the X-, Y- and Z-interpolators.

The maximum operating frequency achieved for the elastic transformation pipeline was 150 MHz. The system was implemented with an operating frequency of 100 MHz. Table 2 shows the speedups achieved using the hardware implementation against an optimized software implementation running on a 3.6 GHz Xeon processor with 1.5 GB of RAM. The speedups are much greater than those achieved by a prior art pipeline. For comparison purposes, the clock rate used to calculate the speedup in all FPGA implementations was 100 MHz. In general, larger neighborhood sizes cause more cache misses in software, therefore resulting in higher hardware speedup rates. Since locality of reference is not a factor in the performance of the proposed pipeline, hardware processing times were the same for all neighborhood sizes.

TABLE 2

Speedup rates against software implementation and previous architectures for various neighborhood sizes.

| $S_{i,j,k}$ dimensions (voxels) | Hardware speedup @ 100 MHz | |
|---|---|---|
| | Prior Art | Proposed |
| 128 × 128 × 128 | 1.8 | 116.7 |
| 64 × 64 × 64 | 1.5 | 94.3 |
| 32 × 32 × 32 | 1.3 | 83.4 |
| 16 × 16 × 16 | 1.2 | 79.2 |

The pipeline presented in the illustrated embodiment was designed to become a block in the elastic image registration architecture presented in FIG. 4. However, in other embodiments it is used independently to provide acceleration in medical image visualization workstations for applications that require fast image warping. It achieves a throughput of one voxel per clock cycle with hardware resource consumption sufficiently low for FPGA implementation as part of a larger system.

3.3 Local Joint Histogram

In the illustrated embodiment of volume subdivision, the subvolume registration is based on maximization of the normalized mutual information (NMI) associated with a subvolume (e.g., $R_{i,j,k}$, described above). NMI is a statistical measure. With smaller subvolumes and corresponding lower voxel count, the mutual histogram (MH) becomes sparse, rendering NMI unreliable. The illustrated embodiment addresses this issue by considering the prior registration information for remaining subvolumes, during calculation of NMI for the subvolume being optimized. Thus, conceptually, for a given subvolume registration the mutual histogram is calculated using the entire reference and floating images, only altering the contributions from the voxels corresponding to the subvolume under consideration. The overall 2D mutual histogram for a subvolume k at level i is calculated as shown in Equations 7a through 7c in which the function "Accumulate(T)", updates registers that store a mutual histogram for the voxels in a given subvolume using the mapping provided by the given transformation T. T* denotes a latest transformation which might not be optimized.

$$MH^i_{TOTAL} = MH^i_{SUBVOLUME} + MH^{i-1}_{REST} \quad (7a)$$

$$MH^i_{SUBVOLUME} = \text{Accumulate}_{j=k}(T^{*i}_j) \quad (7b)$$

$$MH^{i-1}_{REST} = \text{Accumulate}_{j \neq k}(T^{i-1}_j) \quad (7c)$$

Constructing the mutual histogram for a given transformation is a critical step in all MI/NMI-based image registration algorithms. It has been shown that, for large images, accumulating the mutual histogram can take 99.9% of the total mutual information calculation time in software. Thus some embodiments for acceleration of image registration, therefore, attempt to optimize and pipeline implementation of mutual information calculation. A block diagram of the proposed architecture is shown in block 430 of FIG. 4. The following paragraphs describe the operation of its different components.

For a given reference image voxel RI, there are eight intensity pairs: RI paired with intensity values for eight floating image voxels FI0, FI1, FI2, FI3, FI4, FI5, FI6, FI7 and corresponding volume weights. In the illustrated embodiment, the mutual histogram is updated at eight corresponding locations, which amounts to 16 accesses to mutual histogram memory for each reference image voxel RI. This problem is alleviated using internal high speed, dual ported memory. Because this memory can operate at twice the frequency of the main pipeline and can be read and written simultaneously, the mutual histogram access requirement is reduced to four accesses per clock cycle.

FIG. 9A illustrates one scheme to implement this. FIG. 9A is a block diagram that illustrates component blocks of a logic circuit 910 to compute a joint histogram, according to an embodiment. Logic circuit 910 includes 4 weights bus 921, 4 FI bus 923, RI bus 925, output weight bus 927, and control data bus 929, as well as pre-Accumulate block 912, Adder 914, 4:N multiplexer (MUX) 916, N×N Mutual histogram memory 918, and N:4 de-multiplexer (DEMUX) 919.

The pre-accumulate block 912, accumulates the weights for floating image voxels with the same intensity and associates them with the corresponding FI data received on bus 923. The one to four weight values are sent to adder 914 over bus 927 to produce the weight to associate with each FI intensity value to be updated. Since the mutual histogram is organized as N×N block of memory, it is possible to use byte-enable feature or a simple MUX to update these up to four intensities in one clock cycle. The up to 4 FI weights are sent via 4:N MUX to the joint histogram memory 918 along with the associated FI values on bus 923 and the RI value on bus 925 to retrieve the up to four values in the joint histogram memory 918 that each indicates the number of voxels with that combination of FI and RI intensities. This value is output to DEMUX 919 and sent to adder where it is incremented by the corresponding weights. The new value is stored in the joint histogram 918. Signals on control data bus 929 determine whether the joint histogram memory is read or written based on the value out of adder 914. In 3D scans, with 8 weights for surrounding scan elements, the voxel counts are updated four at a time and at twice the speed.

While the mutual histogram is being computed, the row and the column accumulator unit 436 updates the individual histograms. This is done using a structure similar to that of mutual histogram update 910, but with additional pre-accumulate operations. The global sum module 434 keeps track of the number of valid voxels $N_0$ accumulated in the mutual histogram and calculates its reciprocal value $1/N_0$. The resulting value is then used for calculating the individual and joint probabilities.

The architecture described in Castro-Pareja II can achieve a speedup of 100 for elastic registration. However, it is not completely suitable for volume subdivision-based image registration in its current form. The partitioning scheme employed in FAIR-II reported by Castro-Pareja II results in prohibitively high mutual histogram memory requirement—especially due to its calculation of $MH_{REST}$ for every subvolume. A modified architecture, has been optimized for the calculation for $MH_{REST}$ as described next. Moreover, this modified architecture is ideally suited for parallelized implementation using multiple computing units.

Computing $MH_{REST}$, from scratch, for every subvolume is not efficient. In order to address this issue, we introduce mutual histogram buffers $MH_{PRIOR}$, $MH_{REST}$, and $MH_{LOCAL}$ which store the copies of MH during various stages of the method. An overview of this scheme is depicted in FIG. 9B and the detailed description is provided below. FIG. 9B is a block diagram that illustrates component blocks of a logic circuit 940 to compute local and remainder joint histograms, according to an embodiment. Circuit 940 is a particular embodiment of block 918 in circuit 910. Circuit 940 includes an update mutual histogram block 944, a $MH_{REST}$ buffer 942 a $MH_{PRIOR}$ buffer 946 and Local histogram buffer 950, adder 947 and adder 948. Local histogram buffer 950 includes a $MH_{LOCAL}$ buffer 952 and individual histograms buffers $H_F$ buffer 954 and $H_R$ buffer 956 for floating image and reference image histograms, respectively.

At a given subdivision level i, $MH_{PRIOR}$ contains the mutual histogram for the entire image, computed using all the subvolumes and corresponding transformations $T^{i-1}_j$ for all j at the earlier subdivision level i−1. At the beginning of the optimization of each subvolume k, at current subdivision level i, the transformation from the previous level for this subvolume $T^{i-1}_{parent(k)}$ is applied and the resultant mutual histogram output by block 944 is made negative and added to $MH_{PRIOR}$ from buffer 945 in adder 947. This step is equivalent to computing $MH_{REST}$ and the resultant mutual histogram is stored in the $MH_{REST}$ buffer 942. During the optimization of this subvolume k, a candidate transformation $T^{*i}_k$ is applied, and the resultant histogram (contribution of this subvolume) is determined in block 944 and is added in adder 948 to $MH_{REST}$ from buffer 942, to compute the $MH_{TOTAL}$ for the current optimization step. This final histogram is stored in the $MH_{LOCAL}$ buffer 952 and further used for computing a measure of similarity (such as NMI) for the current transformation $T^{*i}_k$. At the end of each level of subdivision i (after optimizing all the subvolumes j), the mutual histogram for the entire image is computed using the updated transformations $T^i_k$ (all j) from block 944 and is stored in $MH_{PRIOR}$ buffer 946, which will subsequently be used at the next subdivision level i+1.

For every subsequent subdivision, after the initial global rigid registration, the algorithm optimizes the individual subvolumes independent of each other. Using multiple computing modules, it is possible to optimize these subvolumes in parallel. Equation 8 shows the speedup that can be achieved using N computing modules for L levels of subdivisions (for same number of iterations/level).

$$speedup = L/[1+(L-1)/N] \quad (8)$$

Further speedup can be achieved by distributing non-overlapping parts of the reference scan across all computing modules for the purpose of MH accumulation, during the global rigid registration. But this strategy will have an additional overhead of accumulating partial mutual histograms.

An accelerated mutual histogram embodiment was implemented as a proof of concept using an Altera Stratix EP1S40 FPGA in a PCI prototyping board manufactured by SBS, Inc. The design achieved a maximum internal frequency of 200 MHz, with a 50 MHz reference image RAM bus and a 100 MHz floating image RAM bus. Reference and floating image memories were implemented using standard PC100 SDRAMS and high-speed SRAMs, respectively. Entropy calculation was implemented using a 4-LUT, first-order polynomial configuration. Mutual information was calculated using 32-bit fixed point numbers.

With wider reference image RAM bus or DDR SDRAMS the projected processing speed of the system is 100 million reference image voxels per second. This processing speed translates to image registration time of approximately 1 minute for image sizes of 256×256×256, with 5 levels of subdivision and 50 optimization iterations at each level. This can be compared to first-generation architecture (digital design) called FAIR (Fast Automatic Image Registration), which computed MI in milliseconds and executed MI-based rigid registration in about 1 minute for smaller images. Table 3 compares the execution time of this embodiment using the proposed hardware against an optimized software implementation. The number of optimization steps in both the cases was identical with the lowest subvolume size of 163. The present embodiment can achieve a speedup factor of 30 for linear registration and over 100 for elastic registration against the corresponding software implementation on a 3.2-GHz PIII Xeon workstation with 1.5 GB of 266 MHz RAM. With parallel implementation as described earlier, further speedup can be achieved. Thus parallel implementation enables 3D image registration in a few seconds.

TABLE 3

Comparison of elastic registration time using accelerated joint histogram computation.

| Image size | Software execution time (seconds) | Hardware execution time (seconds) | Speedup |
|---|---|---|---|
| 64 × 64 × 64 | 57 | 0.50 | 114 |
| 128 × 128 × 128 | 429 | 3.50 | 122 |
| 256 × 256 × 256 | 5231 | 35.55 | 142 |

3.4 Selectable Measures of Similarity

The choice of an image similarity measure for a given application typically depends on the relationship between corresponding voxel intensities in the two images to be registered. Such relationship is, in turn, dependent on the modalities of the images (CT, MRI, PET, SPECT, Ultrasound), and other factors such as the injection of contrast agents to highlight a particular part of the anatomy. Common image similarity measures for registration of images of the same modality include cross-correlation, mean-square difference of intensities and ratio image uniformity. For multimodality image registration, the most commonly used image similarity measures are mutual information and normalized mutual information.

Mutual information is commonly calculated in two steps. In the first step, the joint histogram is computed. The joint histogram is a 2D matrix with information about the statistical correspondence of voxel intensity values in the reference and the floating images. In the second step, the individual and joint image entropies are calculated from the joint histogram. Castro-Pareja II presented an FPGA-based architecture for the acceleration of mutual information calculation in elastic registration and performs both joint histogram computation and entropy calculation.

In the present work, that Castro-Pareja II architecture is adapted for calculation of other image similarity measures such as normalized mutual information, cross-correlation, mean-square difference of intensities and ratio image uniformity in approximately the same time and using approximately the same hardware resources as those used for mutual information calculation. As in the case of mutual information calculation, the joint histogram is calculated as a first step. All the considered image similarity measures can be calculated from the joint histogram in a small fraction (<1% for large images) of the time required to calculate the joint histogram itself, which is proportional to the image size.

The images (scans) to be aligned are the reference image (RI) and the floating image (FI). The transformation T is applied to the voxel coordinates in the floating image space. An image similarity measure is applied to the region of overlap between the reference image and the floating image, defined by $X_O = \{x_O : x_O \in RI \cap T(FI)\}$. The voxel intensity values at $x_O \in X_O$ in the reference and the floating image are denoted by $RI(x_O)$ and $FI(x_O)$, respectively. $N_O$ is the number of reference image voxels in $X_O$. The individual and joint histograms are designated $hist_{RI}(i_{RI})$, $hist_{FI}(i_{FI})$ and $hist_{RI,FI}(i_{RI}, i_{FI})$, where $i_{RI} \in I_{RI}$ and $i_{FI} \in I_{FI}$ are voxel intensities in the reference image voxel intensity spectrum, $I_{RI}$, and floating image voxel intensity spectrum, $I_{FI}$, respectively.

Most of the image similarity measures described in this section can be calculated with a single pass through the joint histogram. Ratio image uniformity, however, requires two passes. In general, the number of joint histogram bins used for joint histogram calculation is between 32×32 and 256×256. In comparison, the size of most 3D medical images is between 64×64×64 and 512×512×512 voxels. Since smaller histogram sizes are normally used for smaller image sizes, the number of joint histogram bins is usually at least an order of magnitude smaller than the image size.

There are many cases, particularly in multimodality image registration, where the correspondence between intensity values is of a statistical nature and cannot be measured with a direct comparison of image intensities at corresponding image locations. In general, in those cases the image similarity measure of choice is usually a statistical one, such as Mutual Information or its variant, Normalized Mutual Information. Mutual information is defined by Equation 9.

$$MI(FI,RI) = h(FI) + h(RI) - h(FI,RI) \quad (9)$$

where the single and joint entropies h are calculated using the following equations 10 through 12.

$$h(RI) = -\Sigma p_{RI}(i_{RI}) \ln p_{RI}(i_{RI}) \quad (10)$$

$$h(FI) = -\Sigma p_{FI}(i_{FI}) \ln p_{FI}(i_{FI}) \quad (11)$$

$$h(FI,RI) = -\Sigma\Sigma p_{FI,RI}(i_{RI},i_{FI}) \ln p_{FI,RI}(i_{RI},i_{FI}) \quad (12)$$

Where $P_{RI}(i_{RI})$ and $p_{FI}(i_{FI})$ are the individual probabilities of observing the intensities x and y in the reference and floating image, respectively, and $P_{FI,RI}(i_{RI},i_{FI})$ is the joint probability of finding the intensity $i_{FI}$ at the floating image location corresponding to a given reference image location with intensity $i_{RI}$. As shown below in Equations 13 to 15, the individual probabilities are obtained from the individual histograms of the region of overlap corresponding to each individual image, and the joint voxel intensity probabilities are obtained from the joint histogram of the region of overlap.

$$p_{RI}(i_{RI}) = \text{hist}_{RI}(i_{RI})/N_0 \quad (13)$$

$$p_{FI}(i_{FI}) = \text{hist}_{FI}(i_{FI})/N_0 \quad (14)$$

$$p_{FI,RI}(i_{RI},i_{FI}) = \text{hist}_{RI,FI}(i_{RI},i_{FI})/N_0 \quad (15)$$

Normalized Mutual Information was conceived as an overlap-invariant version of Mutual Information and is defined by Equation 16.

$$NMI(FI, RI) = \frac{h(FI) + h(RI)}{h(FI, RI)} \quad (16)$$

NMI calculation (Equation 16) differs from MI calculation (Equation 9) only in the last step, where the joint entropy is divided from the sum of the individual entropies, as opposed to being subtracted from the sum.

For images of the same modality, and especially for those in which intensity values are closely related to physical quantities (such as CT or PET images), there is a strong numerical correlation between intensity values in corresponding features. In these cases good choices of image similarity are Normalized Cross-Correlation (NCC) or the Mean-Square Difference (MSD) between intensities at corresponding image locations. Normalized Cross-Correlation in the space domain is defined by Equation 17.

$$NCC(FI, RI) = \frac{\sum_{x_0 \in X_0}(RI(x_0) - \overline{RI})(FI(x_0) - \overline{FI})}{\sigma_{FI} \cdot \sigma_{RI}} \quad (17)$$

Where $\overline{RI}$ and $\overline{FI}$ are the mean intensities of the reference and the floating image, and $\sigma_{RI}$ is defined by Equation 18 and $\sigma_{FI}$ is defined by Equation 19.

$$\sigma_{RI} = \sqrt{\sum_{x_0 \in X_0}(RI(x_0) - \overline{RI})^2} \quad (18)$$

$$\sigma_{FI} = \sqrt{\sum_{x_0 \in X_0}(FI(x_0) - \overline{FI})^2} \quad (19)$$

Calculation of NCC from the joint and individual histograms is performed in two steps. In the first step, $\overline{RI}$ and $\overline{FI}$ are calculated from the individual histograms as given by Equation 20 and Equation 21.

$$\overline{RI} = \frac{1}{N_0}\sum i_{RI} \cdot \text{hist}_{RI}(i_{RI}) \quad (20)$$

$$\overline{FI} = \frac{1}{N_0}\sum i_{FI} \cdot \text{hist}_{FI}(i_{FI}) \quad (21)$$

The second step consists of calculating in parallel the three remaining components of equation (17): the numerator using Equation 22, $\sigma_{RI}$ using Equation 23 and $\sigma_{FI}$ using Equation 24.

$$CC = \sum_{x_0 \in X_0}(RI(x_0) - \overline{RI})(FI(x_0) - \overline{FI}) \quad (22)$$

$$= \sum\sum \text{hist}_{RI,FI}(i_{RI}, i_{FI}) \cdot (i_{RI} - \overline{RI})(i_{FI} - \overline{FI})$$

$$\sigma_{RI} = \sqrt{\Sigma \text{hist}_{RI}(i_{RI}) \cdot (i_{RI} - \overline{RI})^2} \quad (23)$$

$$\sigma_{FI} = \sqrt{\Sigma \text{hist}_{FI}(i_{FI}) \cdot (i_{FI} - \overline{FI})^2} \quad (24)$$

Since $\sigma_{RI}$ and $\sigma_{FI}$ are calculated from the individual histograms, their corresponding accumulations are finished in significantly less time than the calculation of Equation 22. Because of this, $\sigma_{RI}$ and $\sigma_{FI}$ can be computed consecutively using only one accumulation pipeline. Furthermore, calculation of the square root operation is not on the critical path, thus allowing a high-accuracy implementation using an iterative algorithm such as CORDIC.

The Mean-Square Difference (MSD) of Intensities has been used in the literature for single-modality registration of Ultrasound images, PET/SPECT images, MRI images and functional MRI (fMRI) images. MSD is a good image intensity measure for registration of images of the same modality with relatively low noise levels, such as CT images. It has been shown that MSD is an optimal image similarity measure when the images to be registered have Gaussian noise and their intensity transformation is identity. MSD is calculated using Equation 25

$$MSD(FI, RI) = \frac{1}{N_0}\sum_{x_0 \in X_0}(RI(x_0) - FI(x_0))^2 \quad (25)$$

Equation 25 can be rewritten for calculation using the joint histogram as Equation 26.

$$MSD(FI, RI) = \frac{1}{N_0}\sum_{i_{RI} \in I_{RI}}\sum_{i_{FI} \in I_{FI}} \text{hist}_{RI,FI}(i_{RI}, i_{FI}) \cdot (i_{RI} - i_{FI})^2 \quad (26)$$

MSD can therefore be calculated directly from the joint histogram in a single pass.

Ratio Image Uniformity (RIU) was proposed as an image similarity measure for registration of PET images. It has also been used for registration of MRI datasets. RIU is defined by Equation 27

$$RIU(FI, RI) = \frac{1}{N_0 \cdot \mu} \sum_{x_0 \in X_0} \left(\mu - \frac{RI(x_0)}{FI(x_0)}\right)^2. \quad (27)$$

where μ is given by Equation 28.

$$\mu = \frac{1}{N_0} \sum_{x_0 \in X_0} \frac{RI(x_0)}{FI(x_0)}. \quad (28)$$

Unlike the other image similarity measures presented in this section, RIU calculation requires two passes through the joint histogram. The first pass calculates μ from the joint histogram using Equation 29, which is derived from Equation 28.

$$\mu = \frac{1}{N_0} \sum_{i_{RI} \in I_{RI}} \sum_{i_{FI} \in I_{FI}} hist_{RI,FI}(i_{RI}, i_{FI}) \cdot \frac{i_{RI}}{i_{FI}}. \quad (29)$$

Because the number of image intensities in the image spectra is relatively small, the $1/i_{FI}$ coefficients can be stored in a Look-Up Table (LUT). The division operations can therefore be implemented using multipliers. Similarly, Equation 27, rewritten in Equation 30, below, is calculated in a second pass through the joint histogram.

$$RIU(FI, RI) = \frac{1}{N_0} \cdot \frac{1}{\mu} \sum_{i_{RI} \in I_{RI}} \sum_{i_{FI} \in I_{FI}} hist_{RI,FI}(i_{RI}, i_{FI}) \cdot \left(\mu - \frac{i_{RI}}{i_{FI}}\right)^2. \quad (30)$$

Since calculation of the 1/μ term is required only once, it can be implemented using an iterative divider, similarly to the one used to calculate $1/N_0$ in FAIR-II described in Castro-Pareja II.

FIG. 10 shows the block diagrams of the pipelines for calculation of the image similarity measures described above. Most of the arithmetic components in the pipelines consist of adders/subtracters, multipliers, accumulators and multiply-accumulators (MACs). These operations can be efficiently implemented using the resources inside the FPGA. The inverse operations in the RIU pipeline were implemented using LUTs. The p log p operation in the Mutual Information pipeline was implemented using the pipeline presented in Castro-Pareja II. The SQRT operation in the Normalized Cross-Correlation pipeline was implemented using the well-known CORDIC algorithm.

Figure 10A:
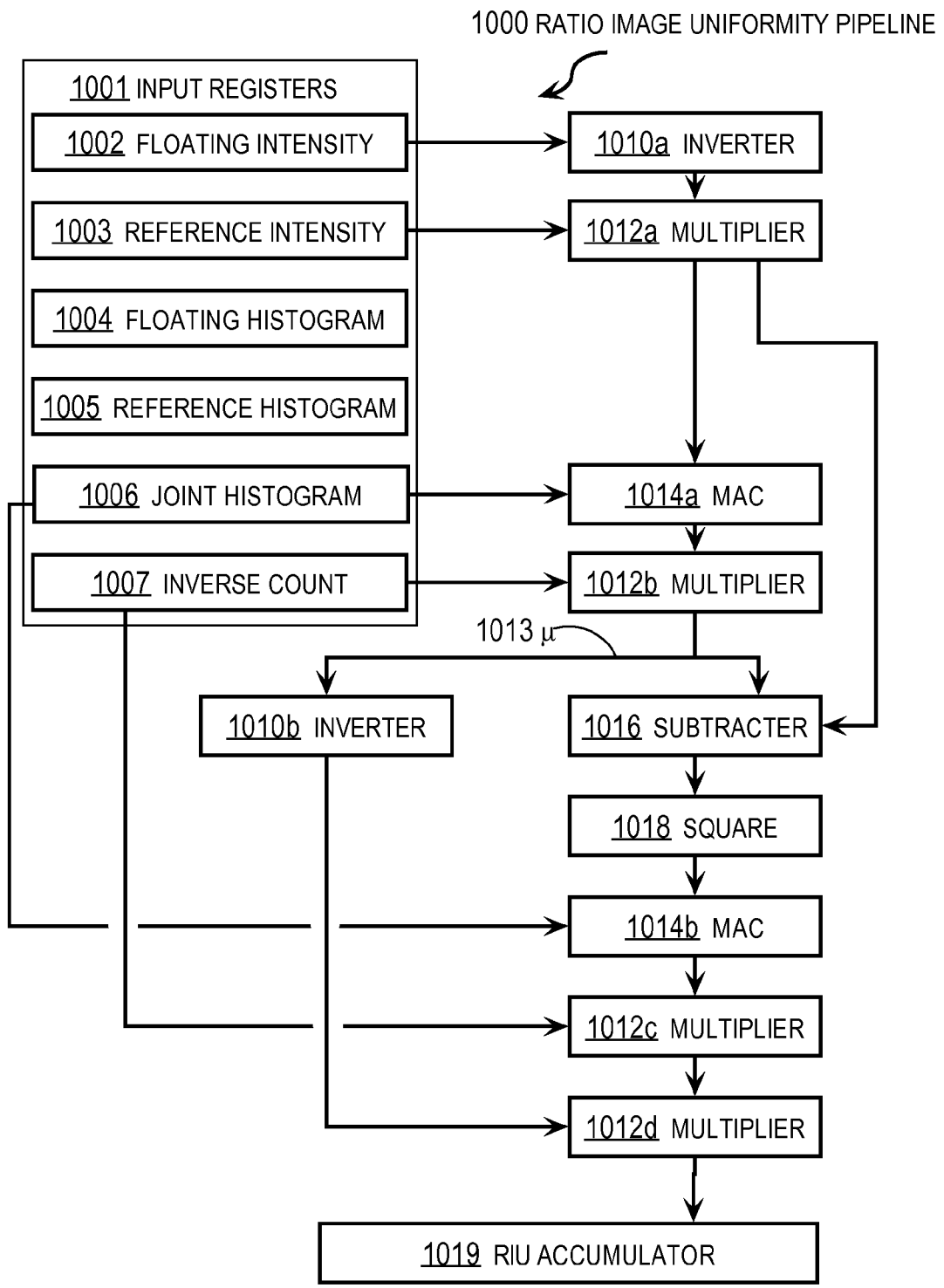
FIG. 10A is a block diagram that illustrates component blocks of a logic circuit to compute a ratio image uniformity measure of similarity from individual and joint histograms, according to an embodiment.

FIG. 10A is a block diagram that illustrates component blocks of an logic circuit 1000 to compute a ratio image uniformity (RIU) measure of similarity from individual and joint histograms, according to an embodiment. The RIU circuit 1000 includes input registers 1001, inverters 1010*a*, 1010*b*, multipliers 1012*a*, 1012*b*, 1012*c*, 1012*d*, MACs 1014*a*, 1014*b*, subtracter 1016, square block 1018 to output a square of an input value, and RIU accumulator 1019. The output 1013 from multiplier 1012*b* is μ, as given by Equation 29.

The input registers 1001 filled by block 430 include a floating intensity register 1002, a reference intensity register 1003, a floating intensity histogram 1004, a reference intensity histogram 1005, a joint histogram 1006, and an inverse count register 1007. The floating intensity register 1002 includes values of intensity in the floating image voxel intensity spectrum, e.g., values of intensity for intensity bins in the floating histogram. Similarly, the reference intensity register 1003 includes values of intensity in the reference image voxel intensity spectrum, e.g., values of intensity for intensity bins in the reference histogram. The floating histogram register 1004 includes number of voxels in each intensity bin in the floating image voxel intensity spectrum. Similarly, the reference histogram register 1005 includes number of voxels in each intensity bin in the reference image voxel intensity spectrum. The joint histogram register 1006 holds the number of voxels in each 2D intensity bin representing a particular combination of reference intensity range and floating intensity range. The inverse count register 1007 holds the total number $N_0$ of voxels in the joint histogram and its inverse $1/N_0$.

The components of circuit block 1000 accomplish the computation of RIU as given by Equation 29 and Equation 30, above. As mentioned above, in some embodiments, inverter 1010*a* is a LUT for the fixed intensity bins of the individual histograms.

Figure 10B:
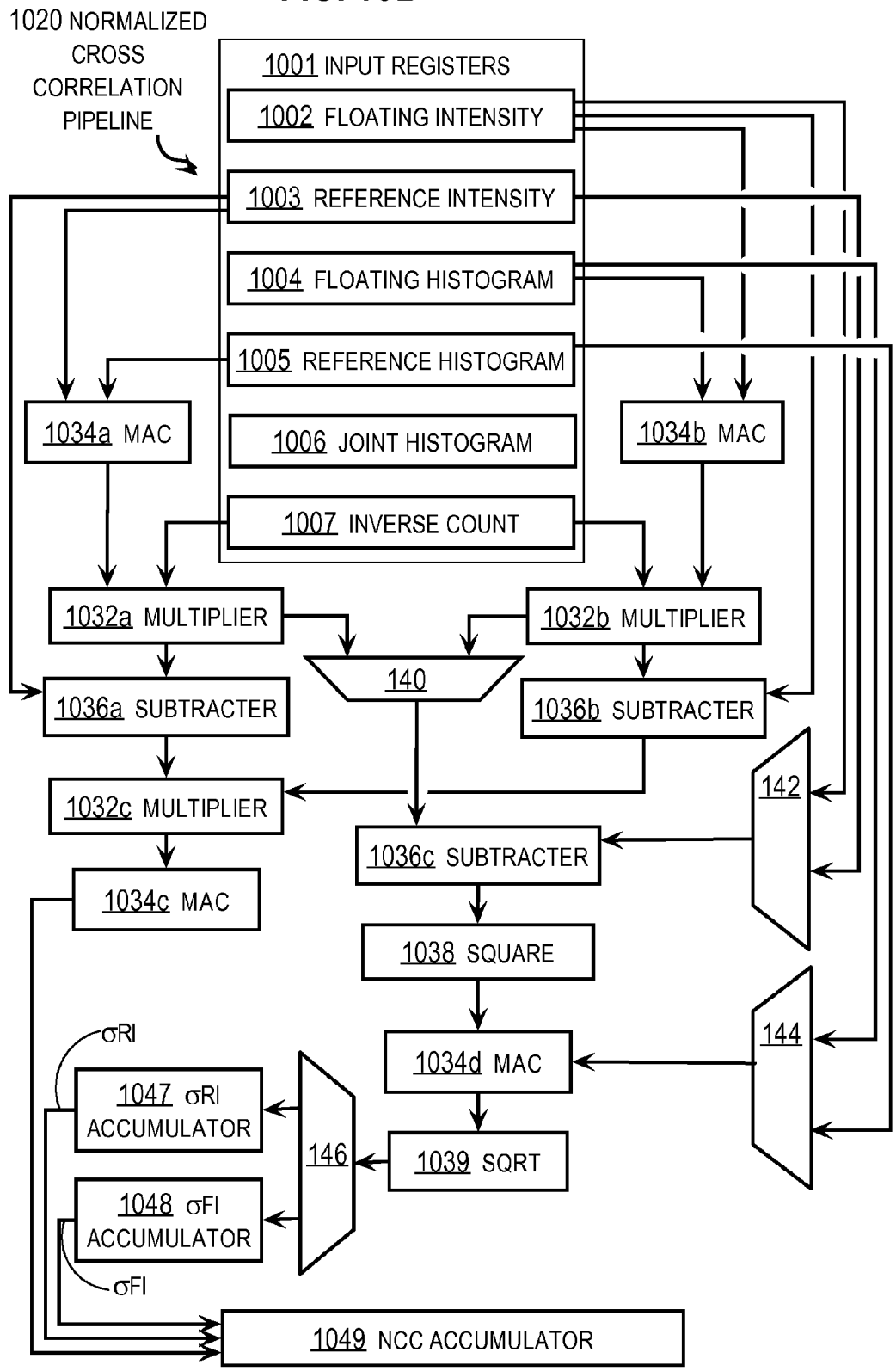
FIG. 10B is a block diagram that illustrates component blocks of anlogic circuit to compute a normalized cross correlation measure of similarity from individual and joint histograms, according to an embodiment.

FIG. 10B is a block diagram that illustrates component blocks of an logic circuit 1020 to compute a normalized cross correlation (NCC) measure of similarity from individual and joint histograms, according to an embodiment. The NCC circuit 1020 includes input registers 1001, multipliers 1032*a*, 1032*b*, 1032*c*, MACs 1034*a*, 1034*b*, 1034*c*, 1034*d* subtracters 1036*a*, 1036*b*, 1036*c*, square block 1038 to output a square of an input value, square root (SQRT) block 1039 to output a square root of an input value, σPI accumulator 1047, σFI accumulator 1048, and NCC accumulator 1049. The NCC circuit 1020 also includes histogram selection blocks 140 and 144, intensity input selector block 142, and output selection block 146. The input registers 1001 are as described above for FIG. 10A.

The Normalized Cross Correlation pipeline provides separate values for CC, $\sigma_{RI}$ and $\sigma_{FI}$ in NCC accumulator 1049. The value for CC is output by MAC 1034*c*. The values for $\sigma_{RI}$ and $\sigma_{FI}$ are output by accumulators 1047 and 1048, respectively. The division is performed in the host computer because of large resource consumption involved in implementing a 32-bit divider, which makes performing this operation (which is needed only once) not cost-effective on the FPGA.

Figure 10C:
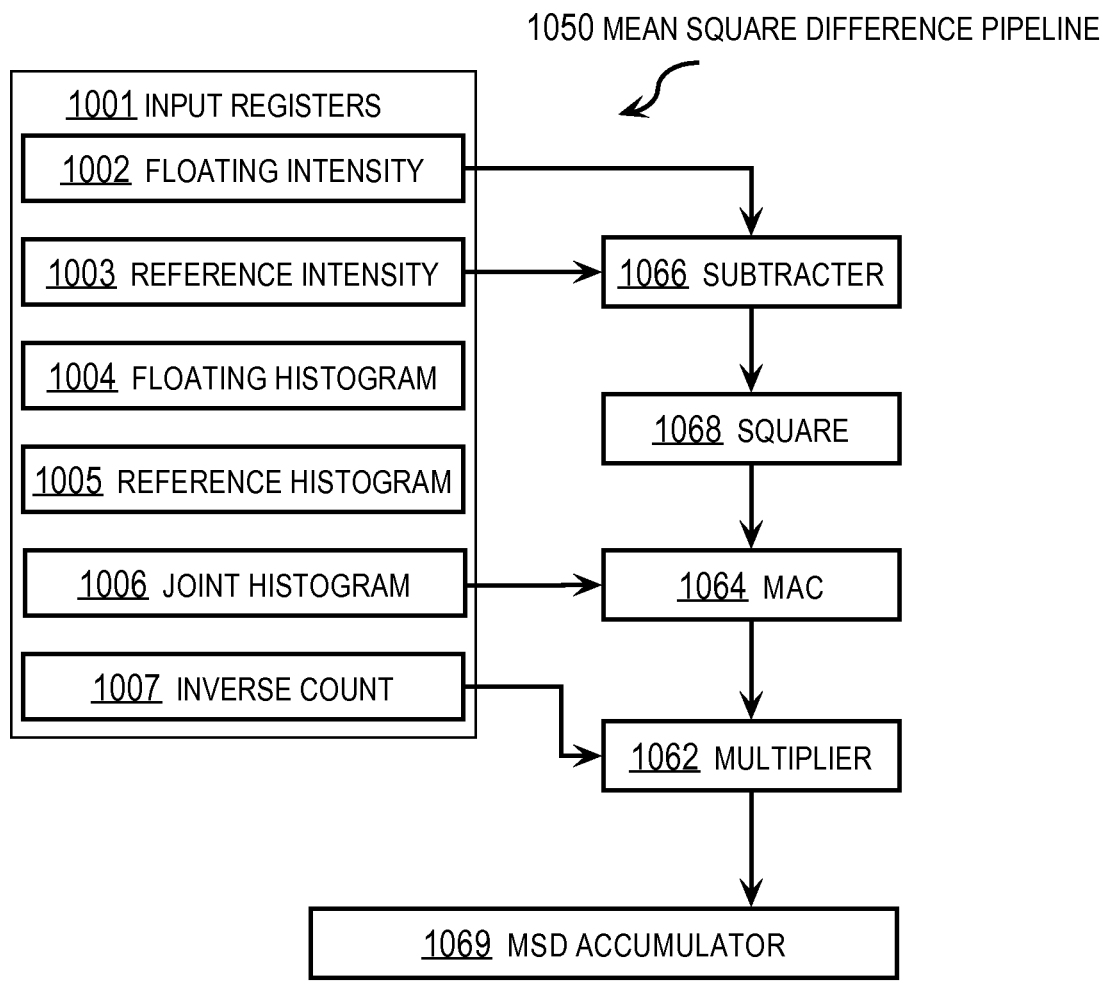
FIG. 10C is a block diagram that illustrates component blocks of anlogic circuit to compute a mean square difference measure of similarity from individual and joint histograms, according to an embodiment.

FIG. 10C is a block diagram that illustrates component blocks of a logic circuit 1050 to compute a mean square difference (MSD) measure of similarity from individual and joint histograms, according to an embodiment. The MSD circuit 1050 includes input registers 1001, multiplier 1062, MAC 1064, subtracter 1066, square block 1068, and MSD accumulator 1069. The input registers 1001 are as described above for FIG. 10A. The components of circuit block 1050 accomplish the computation of MSD as given by Equation 26, above.

Figure 10D:
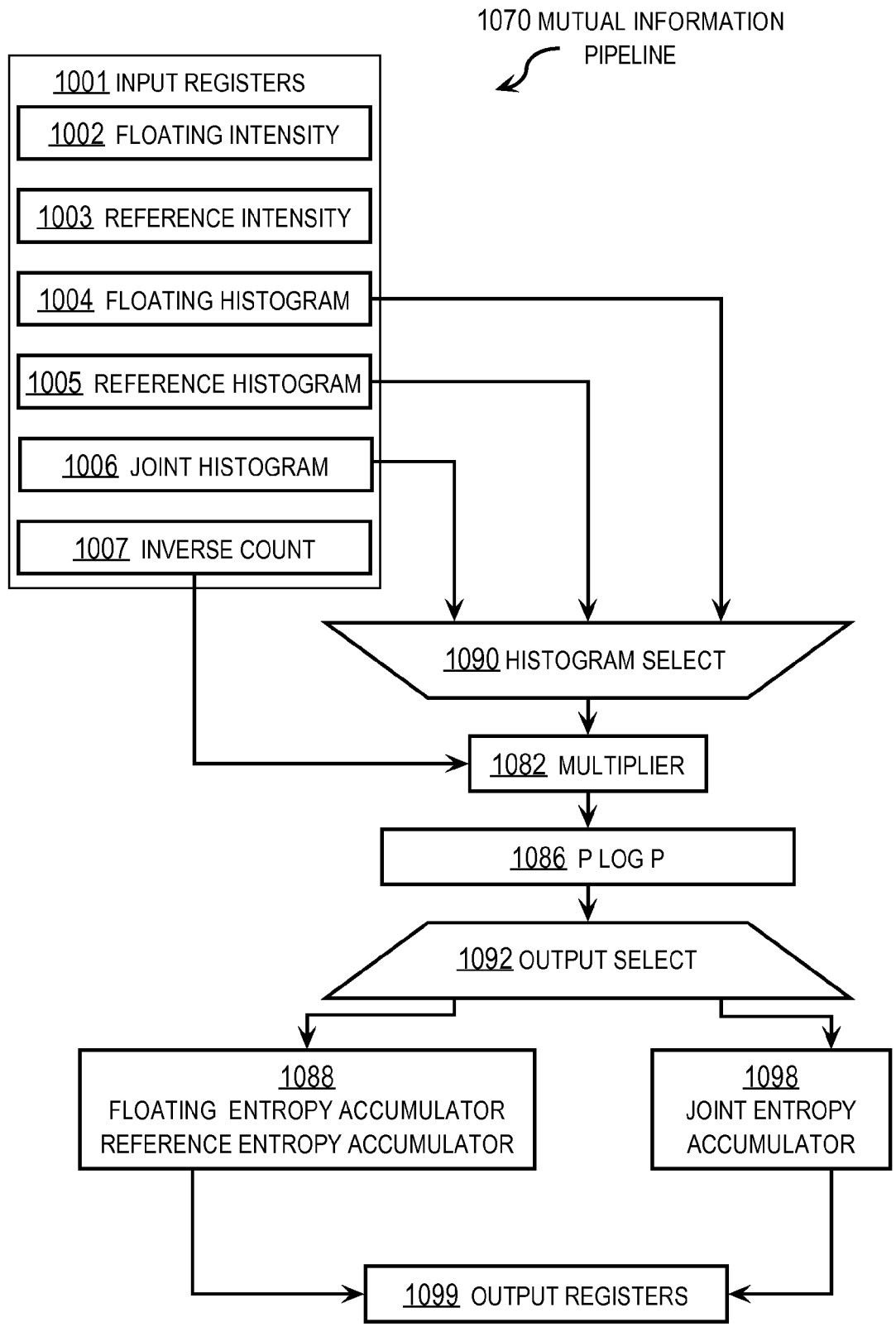
FIG. 10D is a block diagram that illustrates component blocks of anlogic circuit to compute a regular or normalized mutual information measure of similarity from individual and joint histograms, according to an embodiment.

FIG. 10D is a block diagram that illustrates component blocks of a logic circuit 1070 to compute a regular or normalized mutual information (MI or NMI, respectively) as a measure of similarity from individual and joint histograms, according to an embodiment. The MI/NMI circuit 1070 includes input registers 1001, multiplier 1082, p log p block 1086 to output the product of the input value times the log of the input value, individual entropies block 1088 and joint entropy block 1098. The MI/NMI circuit 1070 also includes histogram selection block 1090 and output selection block 1092 and output registers 1099. The input registers 1001 are as described above for FIG. 10A. The components of circuit block 1070 accomplish the computation of the components of Equation 1 and Equation 16, described above. The Mutual Information calculation pipeline, shown in FIG. 10D calculates separate values for the sum of individual entropies and the joint entropy. This allows simple calculation on the host computer of either Mutual Information (by subtracting them from one another) or Normalized Mutual Information (with a division).

On an Altera Stratix FPGA, all the pipelines shown achieve maximum operating frequencies larger than the 100 MHz operating clock frequency of the FAIR-II architecture presented in Castro-Pareja II. In fact, all pipelines can run at twice the clock rate (200 MHz), thereby halving the time spent calculating image similarity after joint histogram calculation.

3.5. Performance

Deformable image registration is computationally demanding and, with execution times in hours for typical 3D medical images on a modern desktop, simply too slow for intra-operative use. The majority of acceleration attempts so far have been along traditional lines: employ more CPUs. Such solutions are often too expensive for intra-operative use. For example, a cluster of 15 2-GHz Pentium CPUs provided a reported 11-fold speedup with deformable image registration of a pair of 256×256×120 MR images in 4 min. Not all voxels in overlapping areas are used in the measures of similarity in these approaches, rendering their registrations less than optimal. Another acceleration approach has been to use massively parallel supercomputers. Such solutions are usually too expensive for intra-operative use. Even so, deformable registration of 256×256×60 brain MR images with 12 CPUs and a brain-specific algorithm took 15 seconds. It is expected that an image four times as large would take at least one minute; and a single processor would take about ten minutes or more. A general-purpose splines-based algorithm that maximized MI performed a reported deformable registration of 512×512×60 images in a few minutes using a 64-CPU shared-memory supercomputer—however a single processor cannot do better than about 10 minutes, even for small images.

According to one or more embodiments of the present invention, a dedicated single processor is capable of delivering dramatically high performance (10-100 and more speedup). We have implemented such a processor customized to perform MI-based image registration in an FPGA chip. FPGAs come with no pre-built function but can be configured to perform any custom function (hence "field programmable"). Their flexibility and massive parallelism permits highly efficient computing. The FPGA approach has allowed us to exploit pipelined computing described above and parallel memory access for significant additional acceleration. Our latest implementation on a $7,500 PCI board with a single FPGA chip that plugs into a desktop PC computed MI up to 100 times faster than an equivalent CPU-based implementation in a single processor. This also represents an order of magnitude speed-up over single processor performance in the above multi-processor approaches. Thus a 256×256×256 image can be elastically registered on a single processor using volume subdivision in less than about 3 minutes in some embodiments.

4. Processor Overview

Figure 11:
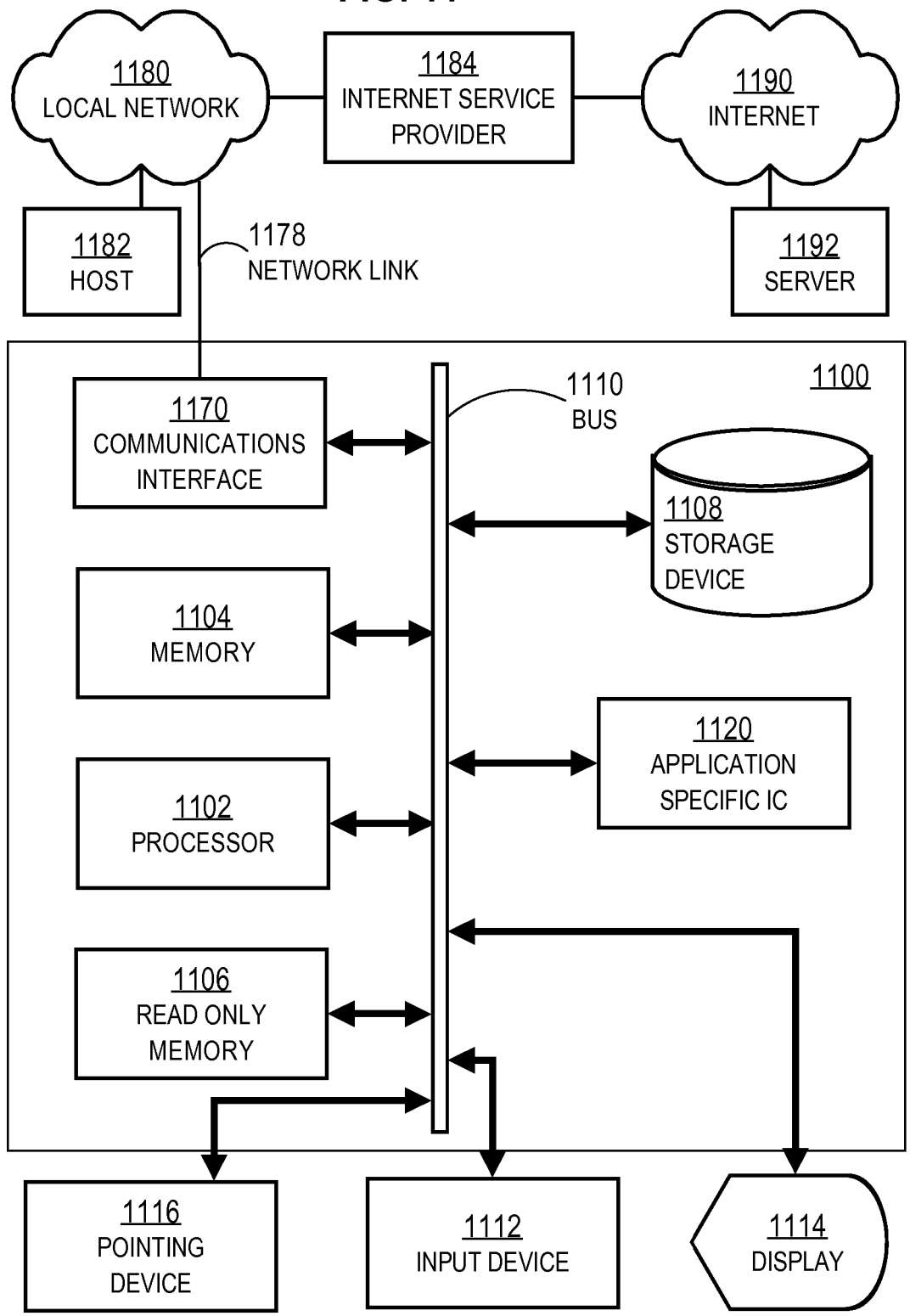
FIG. 11 is a block diagram that illustrates a computer system upon which an embodiment of the invention may be implemented

FIG. 11 is a block diagram that illustrates a computer system 1100 upon which an embodiment of the invention may be implemented. Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitute computer instructions.

Computer system 1100 also includes a memory 1104 coupled to bus 1110. The memory 1104, such as a random access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk or optical disk, for storing information, including instructions, that persists even when the computer system 1100 is turned off or otherwise loses power.

Information, including instructions, is provided to the bus 1110 for use by the processor from an external input device 1112, such as a keyboard containing alphanumeric keys operated by a human user, or a sensor. A sensor detects conditions in its vicinity and transforms those detections into signals compatible with the signals used to represent information in computer system 1100. Other external devices coupled to bus 1110, used primarily for interacting with humans, include a display device 1114, such as a cathode ray tube (CRT) or a liquid crystal display (LCD), for presenting images, and a pointing device 1116, such as a mouse or a trackball or cursor direction keys, for controlling a position of a small cursor image presented on the display 1114 and issuing commands associated with graphical elements presented on the display 1114.

In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 1178 typically provides information communication through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides information representing video data for presentation at display 1114.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120, may be used in place of or in combination with software to implement the invention. Thus, embodiments of the invention are not limited to any specific combination of hardware and software.

The signals transmitted over network link 1178 and other networks through communications interface 1170, which carry information to and from computer system 1100, are exemplary forms of carrier waves. Computer system 1100 can send and receive information, including program code, through the networks 1180, 1190 among others, through network link 1178 and communications interface 1170. In an example using the Internet 1190, a server 1192 transmits program code for a particular application, requested by a message sent from computer 1100, through Internet 1190, ISP equipment 1184, local network 1180 and communications interface 1170. The received code may be executed by processor 1102 as it is received, or may be stored in storage device 1108 or other non-volatile storage for later execution, or both. In this manner, computer system 1100 may obtain application program code in the form of a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to an infra-red signal, a carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

5. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for elastic registration of multiple scans of internal properties of a body, comprising the steps of:
   receiving control point transformation data that indicates a vector $\phi$ of values for transform parameters for each control point of a plurality of control points that correspond to scan elements in a reference scan, wherein
   the vector $\phi$ of values for transform parameters for a particular control point indicates how to associate the particular control point with one or more scan elements in a floating scan different from the reference scan, and every scan element in the reference scan has a position indicated by a plurality of coordinate values for a corresponding plurality of dimensions;

determining a plurality of subsets of contiguous scan elements in the reference scan, wherein each subset of contiguous scan elements is associated with only one control point;

determining on a processor an output vector v of values for transform parameters for each scan element in a first subset of scan elements of the reference scan, including the steps of determining a first cubic B-spline coefficient coef1=ΣB(w1) φ for a first coordinate value of a scan element in the first subset a distance w1 from a control point along a first dimension of the plurality of dimensions summed over four control points, and determining a plurality of cubic B-spline coefficients coef2=ΣB(w2) coef1 for a corresponding plurality of coordinate values of a plurality of scan elements in the first subset a distance w2 from a control point along a different second dimension of the plurality of dimensions each summed over four control points, and determining v based at least in part on coef2 for each scan element in the first subset; and after determining the output vector v of values for each scan element in the first subset, then determining on a processor the output vector v of values for each scan element in a different second subset of scan elements of the reference scan, wherein B(n) is a well known function for contributions at an arbitrary point from a control point at a normalized distance n=d/s where d is distance from the control point to the arbitrary point and s is separation of adjacent control points that straddle the arbitrary point.

2. A method as recited in claim 1, wherein the vector φ of values for transform parameters contains values of shifts in a plurality of Cartesian dimensions.

3. A method as recited in claim 1, wherein the vector φ of values for transform parameters includes values of rotation in a plurality of quaternion dimensions.

4. A method as recited in claim 3, said step of receiving control point transformation data further comprising receiving control point transformation data for fewer than four control points in each dimension of the reference scan for determining an output vector of values for transform parameters for each scan element in a subset of scan elements of the reference scan after the initial subset.

5. A method as recited in claim 1, said step of receiving control point transformation data further comprising receiving control point transformation data for four control points in each dimension of the reference scan for determining an initial output vector of values for transform parameters for each scan element in an initial subset of scan elements of the reference scan.

6. A method as recited in claim 1, wherein:

said step of determining the output vector v of values for transform parameters for each scan element in the first subset further comprises determining for each value of coef2 a plurality of cubic B-spline coefficients coef3=ΣB(w3) coef2 for a corresponding plurality of coordinate values of a plurality of scan elements in the first subset a distance w3 from a control point along a different third dimension of the plurality of dimensions each summed over four control points, and said step of determining v based at least in part on coef2 for each scan element in the first subset further comprises determining v based at least in part on coef3.

7. A method as recited in claim 1, further comprising transforming a treatment plan for the body based at least in part on the output vector v of values for each scan element in the first subset.

8. An apparatus for elastic registration of multiple scans of internal properties of a body, comprising:

a computer-readable memory for storing control point transformation data that indicates a vector φ of values for transform parameters for each control point of a plurality of control points that correspond to scan elements in a reference scan, wherein the vector φ of values for transform parameters for a particular control point indicates how to associate the particular control point with one or more scan elements in a floating scan different from the reference scan, and every scan element in the reference scan has a position indicated by a plurality of coordinate values for a corresponding plurality of dimensions;

a first logic circuit, including a first register, configured for determining and storing in the first register, for a first subset of contiguous scan elements in the reference scan, a first cubic B-spline coefficient coef1=ΣB(w1) φ for a first coordinate value of a scan element in a distance w1 from a control point along a first dimension of the plurality of dimensions summed over four control points; and a second logic circuit, including a second register, configured for reading the first register and determining a plurality of cubic B-spline coefficients coef2=ΣB(w2) coef1 for a corresponding plurality of coordinate values of a plurality of scan elements in the first subset a distance w2 from a control point along a different second dimension of the plurality of dimensions each summed over four control points and storing the each coef2 value in succession in the second register, wherein the reference scan includes a plurality of subsets of contiguous scan elements in the reference scan and each subset is associated with only one control point, and B(n) is a well known function for contributions at an arbitrary point from a control point at a normalized distance n=d/s where d is the distance from the control point to the arbitrary point and s is the separation of adjacent control points that straddle the arbitrary point.

9. An apparatus as recited in claim 8, further comprising:

a third logic circuit, including a third register, configured for reading the second register and determining for each value of coef2 a plurality of cubic B-spline coefficients coef3=ΣB(w3) coef2 for a corresponding plurality of coordinate values of a plurality of scan elements in the first subset a distance w3 from a control point along a different third dimension of the plurality of dimensions each summed over four control points and storing the each coef3 value in succession in the third register.

10. An apparatus as recited in claim 9, further comprising one or more logic circuits configured for storing the successive values in the third register in computer readable memory in association with each scan element in the reference scan.

11. An apparatus as recited in claim 9, wherein the first logic circuit contains three field programmable gate array (FPGA) multipliers, the second logic circuit contains six FPGA multipliers and the third logic circuit contains twelve FPGA multipliers.

12. An apparatus as recited in claim 8, wherein at least one of the first logic circuit and the second logic circuit is a programmed field-programmable gate array (FPGA).

13. An apparatus as recited in claim 8, wherein at least one of the first logic circuit and the second logic circuit further comprises a look-up table (LUT) for values of B(n) for a plurality of values of n.

14. An apparatus as recited in claim 8, wherein the computer-readable memory is a static random access memory (SRAM).

15. An apparatus as recited in claim 8, further comprising one or more logic circuits configured for storing the successive values in the second register in computer-readable memory in association with each scan element in the reference scan.

16. An apparatus as recited in claim 8, further comprising one or more logic circuits configured for associating one or more scan elements in the floating scan with the reference scan based at least in part on contents of the second register.

17. An apparatus as recited in claim 8, further comprising:
one or more processors; and
a computer readable-medium holding one or more sequences of instructions wherein execution of the one or more sequences of instructions by one or more processors causes the one or more processors to perform the step of transforming a treatment plan for the body based at least in part on the second transformation.

18. An apparatus as recited in claim 8, further comprising one or more logic circuits configured for determining a value for a measure of similarity between the reference scan and the floating scan based at least in part on the contents of the second register.

19. An apparatus as recited in claim 8, further comprising a single processor configured to perform in less time than three minutes automatic elastic registration that maximizes a similarity measure based on substantively every scan element in a region of overlap between two scans each having 256× 256×256 scan elements.

20. An apparatus for elastic registration of multiple scans of internal properties of a body, comprising:
a computer-readable medium for storing:
a two dimensional first joint histogram of mutual information based on reference scan data and floating scan data for a plurality of scan elements; and
subvolume data that indicates a subset of contiguous scan elements of the plurality of scan elements,
wherein
reference scan data indicates for the plurality of scan elements a corresponding plurality of intensity values based on a first scan of the body,
floating scan data indicates for the plurality of scan elements a corresponding plurality of intensity values based on a different second scan of the body and a first transformation for mapping coordinates of scan elements from the first scan to coordinates of scan elements in the second scan, and
the joint histogram indicates a number of the plurality of scan elements that have intensity values based on the first scan in a first range of intensities and have intensity values based on the second scan in a second range of intensities;
a logic circuit configured for determining a local joint histogram of mutual information based on the reference scan data and the floating scan data for the subset of contiguous scan elements;
a logic circuit configured for determining a remainder joint histogram of mutual information by subtracting the local joint histogram from the first joint histogram and storing the remainder joint histogram on the computer-readable medium; and
a logic circuit configured for determining a value for a similarity measure, based at least in part on the remainder joint histogram, for a second transformation for mapping coordinates of the subset of scan elements from the first scan to coordinates of scan elements in the second scan.

21. An apparatus for elastic registration of multiple scans of internal properties of a body, comprising:
a computer-readable medium for storing a two dimensional joint histogram of mutual information based on reference scan data and floating scan data for a plurality of scan elements wherein
reference scan data indicates for the plurality of scan elements a corresponding plurality of intensity values based on a first scan of the body,
floating scan data indicates for the plurality of scan elements a corresponding plurality of intensity values based on a different second scan of the body and a first transformation for mapping coordinates of scan elements from the first scan to coordinates of scan elements in the second scan, and
the joint histogram indicates a number of the plurality of scan elements that have intensity values based on the first scan in a first range of intensities and have intensity values based on the second scan in a second range of intensities; and
a logic circuit configured for determining based on the joint histogram a measure of similarity for the reference scan data and the floating scan data, wherein the measure of similarity is not mutual information,
whereby an elastic transformation can be determined based on the measure of similarity.

* * * * *